US006567847B1

(12) United States Patent
Inoue

(10) Patent No.: US 6,567,847 B1
(45) Date of Patent: May 20, 2003

(54) DATA TRANSMITTING AND RECEIVING SYSTEM

(75) Inventor: Hiraku Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/130,153

(22) Filed: Aug. 6, 1998

(30) Foreign Application Priority Data

Aug. 15, 1997 (JP) .............................................. 9-220366

(51) Int. Cl.[7] .............................................. G06F 15/16
(52) U.S. Cl. ...................................................... 709/219
(58) Field of Search ................................. 709/203, 217, 709/219; 711/4; 704/500, 201; 705/26, 40, 16, 17, 21; 725/5; 700/233, 234, 237; 369/84

(56) References Cited

U.S. PATENT DOCUMENTS

| | | | | |
|---|---|---|---|---|
| 4,789,863 A | * | 12/1988 | Bush .......................... | 340/5.9 |
| 5,445,295 A | * | 8/1995 | Brown .......................... | 221/3 |
| 5,633,839 A | * | 5/1997 | Alexander et al. .......... | 700/234 |
| 5,636,276 A | * | 6/1997 | Brugger ....................... | 705/54 |
| 5,732,216 A | * | 3/1998 | Logan et al. ................ | 709/203 |
| 5,748,485 A | * | 5/1998 | Christiansen et al. ....... | 700/234 |
| 5,794,217 A | * | 8/1998 | Allen ........................... | 705/27 |
| 5,802,029 A | * | 9/1998 | Zucker ......................... | 369/44.29 |
| 5,822,216 A | * | 10/1998 | Satchell, Jr. et al. ........ | 700/232 |
| 5,835,843 A | * | 11/1998 | Haddad ....................... | 725/115 |
| 5,841,979 A | * | 11/1998 | Schulhof et al. ............ | 709/237 |
| 5,867,466 A | * | 2/1999 | Igarashi et al. .............. | 369/58 |
| 5,870,710 A | * | 2/1999 | Ozawa et al. ............... | 704/500 |
| 5,930,768 A | * | 7/1999 | Hooban ....................... | 705/27 |
| 5,956,716 A | * | 9/1999 | Kenner et al. ............... | 707/10 |
| 5,959,944 A | * | 9/1999 | Dockes et al. ............... | 369/84 |
| 6,011,758 A | * | 1/2000 | Dockes et al. ............... | 369/30 |
| 6,038,601 A | * | 3/2000 | Lambert et al. ............. | 709/226 |
| 6,151,286 A | * | 11/2000 | Inoue .......................... | 369/84 |
| 6,388,766 B1 | * | 5/2002 | Inoue et al. ................. | 358/1.18 |

OTHER PUBLICATIONS

Nakano et al., The Disc Designers, Mar. 1997, Sound on Sound, vol. 12, Issue 5, as printed from www.minidisc.org/sound_on_sound.html.*
Sharp, MD–X8PC and MD–X8 Can Dub Music from the Internet onto MD Media—An Industry First, Jun. 12, 1997, from sharp–world.com/corporate/news/9722.htm.*
Vizard, Internet Recording, Dec. 1997, Popular Science, vol. 251, Issue 6, p. 38.*
Williams, Sharp Makes Recording Internet and Digital Audio Easy, Jun. 16, 1997, Newsbytes News Network, p. 1.*
Bessman, CD Vending Machines Go to Market, Billboard, Jul. 9, 1994, vol. 106, Issue 28, pp. 62–63.*
Onufryk et al., Consumer Devices for Networked Audio, Proceedings of the IEEE International Symposium on Industrial Electronics, 1997. ISIE '97, Jul. 11, 1997, vol. 1, pp. SS27ff.*
Tamaki, Vending Machines Dispense CDs for $13.99 in the Slot, The Los Angeles Times, Apr. 25, 1994, pp. 1ff.*
Frankel et al., "Chapter 1: The History of MP3", MP3 Power! with Winamp, Muska & Lipman Publishing, pp. 7–9, 1999.*
Haring, "Sound advances open doors to bootleggers Albums on Web sites proliferate", USA Today, Washington, D.C., May 27, 1997, p. D, 8:1.*
Levitt, "Music to a pirate's ears", Informationweek, Manhasset, Jun. 30, 1997, p. 76, Jun. 1997.*

* cited by examiner

Primary Examiner—Zarni Maung
Assistant Examiner—Bradley Edelman
(74) Attorney, Agent, or Firm—Jay H. Maioli

(57) ABSTRACT

A transmitting and receiving system wherein a data file produced by a user can be uploaded into a server and the updated data file can be downloaded to another user. The transmitting and receiving system provides a place where general users can lay their works open and can sell the works.

2 Claims, 33 Drawing Sheets

F I G. 2

| CONTENTS No. | USER NAME | PASSWORD | TITLE | ATRAC DATA | CHARACTER DATA | IMAGE DATA | NUMBER OF DOWNLOAD TIMES | NUMBER OF UNPAID TIMES | URL | AMOUNT | REGISTRATION DATE |
|---|---|---|---|---|---|---|---|---|---|---|---|
| #1 | Taro | rsfskjhk | Bye Bye | #1.atc | #1.txt | #1.glf | 120 | 20 | http://www.xxx.....#1 | ¥300 | 97.8.1 |
| #2 | Jiro | lsk?ls: | Hello | #2.atc | #2.txt | — | 10 | 0 | http://www.xxx.....#2 | ¥1,000 | 97.8.2 |
| #3 | Ichiro | sslsrgh | Morning | #3.atc | — | #3.glf | 15 | — | — | Free | 97.8.5 |
| ...... | ...... | ...... | ...... | ...... | ...... | ...... | ...... | ...... | ...... | ...... | ...... |

FILE STRUCTURE IN SERVER

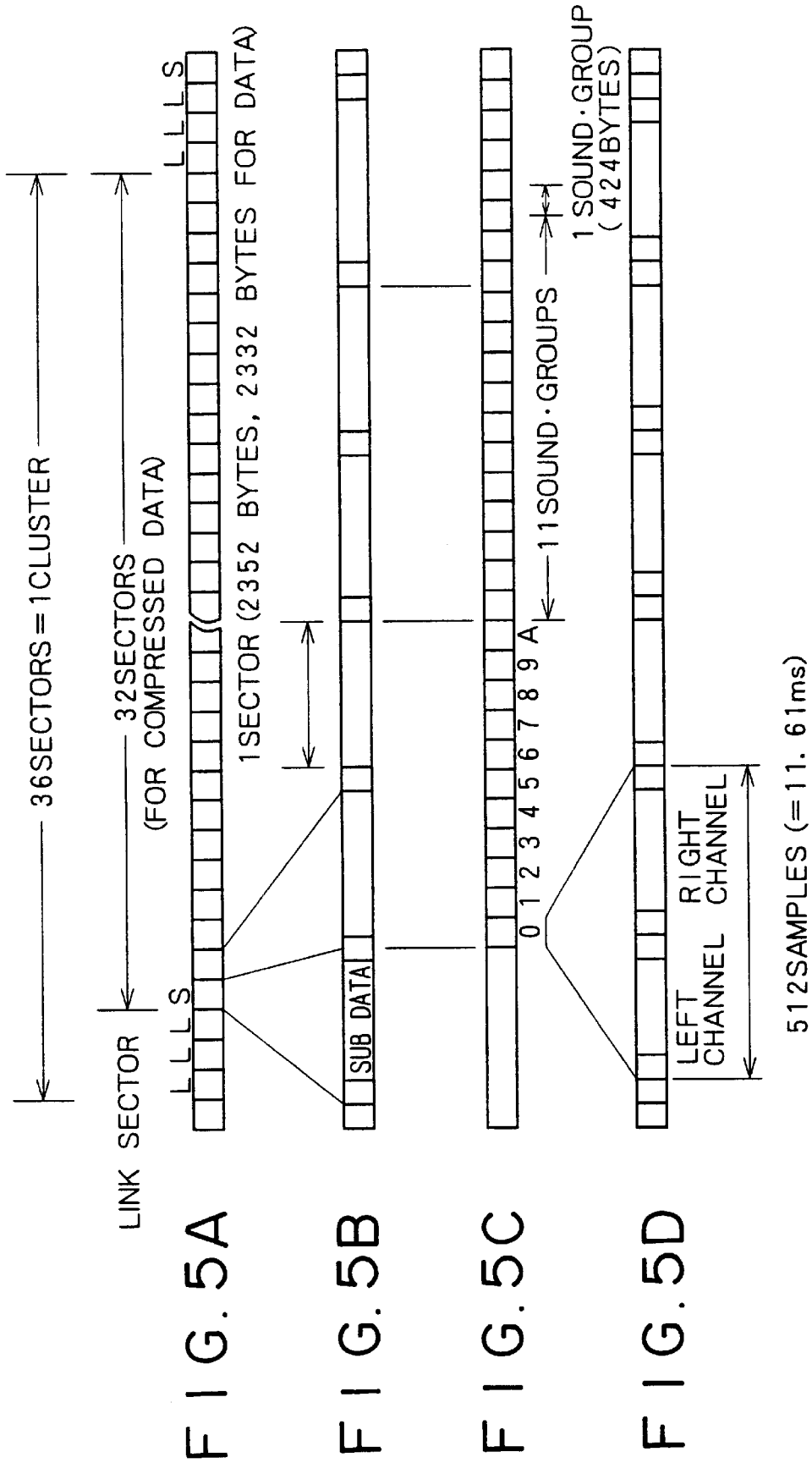

FIG. 6

| 1 | 2 | 3 | 4 | |
|---|---|---|---|---|
| ←——— 16bits ———→ | | ←——— 16bits ———→ | | |
| MSB      LSB | MSB      LSB | MSB      LSB | MSB      LSB | |
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| Cluster H | Cluster L | Sector (00h) | MODE (02h) | 3 |
| 00000000 | 00000000 | 00000000 | 00000000 | 4 |
| 00000000 | 00000000 | 00000000 | 00000000 | 5 |
| 00000000 | 00000000 | 00000000 | 00000000 | 6 |
| Maker code | Model code | First TNO | Last TNO | 7 |
| 00000000 | 00000000 | 00000000 | Used Sectors | 8 |
| 00000000 | 00000000 | 00000000 | 00000000 | 9 |
| 00000000 | 00000000 | 00000000 | Disc Serial No | 10 |
| Disc | ID | P-DFA | P-EMPTY | 11 |
| P-FRA | P-TNO1 | P-TNO2 | P-TNO3 | 12 |
| P-TNO4 | P-TNO5 | P-TNO6 | P-TNO7 | 13 |

| | | | | |
|---|---|---|---|---|
| P-TNO248 | P-TNO249 | P-TNO250 | P-TNO251 | 74 |
| P-TNO252 | P-TNO253 | P-TNO254 | P-TNO255 | 75 |
| 00000000 | 00000000 | 00000000 | 00000000 | 76 |
| 00000000 | 00000000 | 00000000 | 00000000 | 77 |
| (01h) | START ADDRESS | | TRACK MODE | 78 |
| | END ADDRESS | | LINK INFORMATION | 79 |
| (02h) | START ADDRESS | | TRACK MODE | 80 |
| | END ADDRESS | | LINK INFORMATION | 81 |
| (03h) | START ADDRESS | | TRACK MODE | 82 |
| | END ADDRESS | | LINK INFORMATION | 83 |

| | | | | |
|---|---|---|---|---|
| (FCh) | START ADDRESS | | TRACK MODE | 580 |
| | END ADDRESS | | LINK INFORMATION | 581 |
| (FDh) | START ADDRESS | | TRACK MODE | 582 |
| | END ADDRESS | | LINK INFORMATION | 583 |
| (FEh) | START ADDRESS | | TRACK MODE | 584 |
| | END ADDRESS | | LINK INFORMATION | 585 |
| (FFh) | START ADDRESS | | TRACK MODE | 586 |
| | END ADDRESS | | LINK INFORMATION | 587 |

U-TOC SECTOR-0

Start and End Address 24bits

Track mode 8bits d1 d2 d3 d4 d5 d6 d7 d8 d1=0:write protected
 =1:write permitted
d2=0:copy right protected
 =1:not protected
d3=0:original
 =1:1st or higher generation
d4=0:audio
 =1:reserved
d5=0: ⎤ normal audio
d6=0: ⎦ else deserved
d7=0:mono
 =1:stereo
d8=0:emphasis off
 =1:emphasis 50/15μs

FIG. 10

| 1 | 2 | 3 | 4 | |
|---|---|---|---|---|
| ←—16bits—→ | | ←—16bits—→ | | |
| MSB    LSB | MSB    LSB | MSB    LSB | MSB    LSB | |
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| Cluster H | Cluster L | Sector (01h) | MODE (02h) | 3 |
| 00000000 | 00000000 | 00000000 | 00000000 | 4 |
| 00000000 | 00000000 | 00000000 | 00000000 | 5 |
| 00000000 | 00000000 | 00000000 | 00000000 | 6 |
| 00000000 | 00000000 | 00000000 | 00000000 | 7 |
| 00000000 | 00000000 | 00000000 | 00000000 | 8 |
| 00000000 | 00000000 | 00000000 | 00000000 | 9 |
| 00000000 | 00000000 | 00000000 | 00000000 | 10 |
| 00000000 | 00000000 | 00000000 | P-EMPTY | 11 |
| 00000000 | P-TNA1 | P-TNA2 | P-TNA3 | 12 |
| P-TNA4 | P-TNA5 | P-TNA6 | P-TNA7 | 13 |

| | | | | |
|---|---|---|---|---|
| P-TNA248 | P-TNA249 | P-TNA250 | P-TNA251 | 74 |
| P-TNA252 | P-TNA253 | P-TNA254 | P-TNA255 | 75 |
| DISK NAME | | | | 76 |
| DISK NAME | | | LINK INFORMATION | 77 |
| (01h) DISC NAME / TRACK NAME | | | | 78 |
| DISC NAME / TRACK NAME | | | LINK INFORMATION | 79 |
| (02h) DISC NAME / TRACK NAME | | | | 80 |
| DISC NAME / TRACK NAME | | | LINK INFORMATION | 81 |
| (03h) DISC NAME / TRACK NAME | | | | 82 |
| DISC NAME / TRACK NAME | | | LINK INFORMATION | 83 |

| | | | | |
|---|---|---|---|---|
| (FEh) DISC NAME / TRACK NAME | | | | 584 |
| DISC NAME / TRACK NAME | | | LINK INFORMATION | 585 |
| (FFh) DISC NAME / TRACK NAME | | | | 586 |
| DISC NAME / TRACK NAME | | | LINK INFORMATION | 587 |

U-TOC SECTOR-1

FIG. 11

| 1 | 2 | 3 | 4 | |
|---|---|---|---|---|
| ←―16bits―→ | | ←―16bits―→ | | |
| MSB      LSB | MSB      LSB | MSB      LSB | MSB      LSB | |
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| Cluster H | Cluster L | Sector (02h) | MODE (02h) | 3 |
| 00000000 | 00000000 | 00000000 | 00000000 | 4 |
| 00000000 | 00000000 | 00000000 | 00000000 | 5 |
| 00000000 | 00000000 | 00000000 | 00000000 | 6 |
| 00000000 | 00000000 | 00000000 | 00000000 | 7 |
| 00000000 | 00000000 | 00000000 | 00000000 | 8 |
| 00000000 | 00000000 | 00000000 | 00000000 | 9 |
| 00000000 | 00000000 | 00000000 | 00000000 | 10 |
| 00000000 | 00000000 | 00000000 | P-EMPTY | 11 |
| 00000000 | P-TRD1 | P-TRD2 | P-TRD3 | 12 |
| P-TRD4 | P-TRD5 | P-TRD6 | P-TRD7 | 13 |

| | | | | |
|---|---|---|---|---|
| | P-TRD248 | P-TRD249 | P-TRD250 | P-TRD251 | 74 |
| | P-TRD252 | P-TRD253 | P-TRD254 | P-TRD255 | 75 |
| | DISC RECORDING DATE | | | | 76 |
| | | | MAKER CODE | MODEL CODE | 77 |
| (01h) | TRACK RECORDING DATE | | | | 78 |
| | | | MAKER CODE | MODEL CODE | 79 |
| (02h) | TRACK RECORDING DATE | | | | 80 |
| | | | MAKER CODE | MODEL CODE | 81 |
| (03h) | TRACK RECORDING DATE | | | | 82 |
| | | | MAKER CODE | MODEL CODE | 83 |

| | | | | |
|---|---|---|---|---|
| (FEh) | TRACK RECORDING DATE | | | | 584 |
| | | | MAKER CODE | (LINK INFORMATION) | 585 |
| (FFh) | TRACK RECORDING DATE | | | | 586 |
| | | | MAKER CODE | (LINK INFORMATION) | 587 |

U-TOC-SECTOR-2

FIG. 12

| 1 | 2 | 3 | 4 | |
|---|---|---|---|---|
| MSB ←——16bits LSB | MSB —— LSB | MSB ←——16bits LSB | MSB —— LSB | |
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| Cluster H | Cluster L | Sector (04h) | MODE (02h) | 3 |
| 00000000 | 00000000 | 00000000 | 00000000 | 4 |
| 00000000 | 00000000 | 00000000 | 00000000 | 5 |
| 00000000 | 00000000 | 00000000 | 00000000 | 6 |
| 00000000 | 00000000 | 00000000 | 00000000 | 7 |
| 00000000 | 00000000 | 00000000 | 00000000 | 8 |
| 00000000 | 00000000 | 00000000 | 00000000 | 9 |
| 00000000 | 00000000 | 00000000 | char・code | 10 |
| 00000000 | 00000000 | 00000000 | P-EMPTY | 11 |
| 00000000 | P-TNA1 | P-TNA2 | P-TNA3 | 12 |
| P-TNA4 | P-TNA5 | P-TNA6 | P-TNA7 | 13 |

| | | | | |
|---|---|---|---|---|
| P-TNA248 | P-TNA249 | P-TNA250 | P-TNA251 | 74 |
| P-TNA252 | P-TNA253 | P-TNA254 | P-TNA255 | 75 |
| DISC NAME | | | | 76 |
| DISC NAME | | | LINK INFORMATION | 77 |
| (01h) DISC NAME / TRACK NAME | | | | 78 |
| DISC NAME / TRACK NAME | | | LINK INFORMATION | 79 |
| (02h) DISC NAME / TRACK NAME | | | | 80 |
| DISC NAME / TRACK NAME | | | LINK INFORMATION | 81 |
| (03h) DISC NAME / TRACK NAME | | | | 82 |
| DISC NAME / TRACK NAME | | | LINK INFORMATION | 83 |

| | | | | |
|---|---|---|---|---|
| (FEh) DISC NAME / TRACK NAME | | | | 584 |
| DISC NAME / TRACK NAME | | | LINK INFORMATION | 585 |
| (FFh) DISC NAME / TRACK NAME | | | | 586 |
| DISC NAME / TRACK NAME | | | LINK INFORMATION | 587 |

U-TOC SECTOR-4

FLOW OF SIGNALS UPON DOWNLOADING

FLOW OF SIGNALS UPON UPLOADING

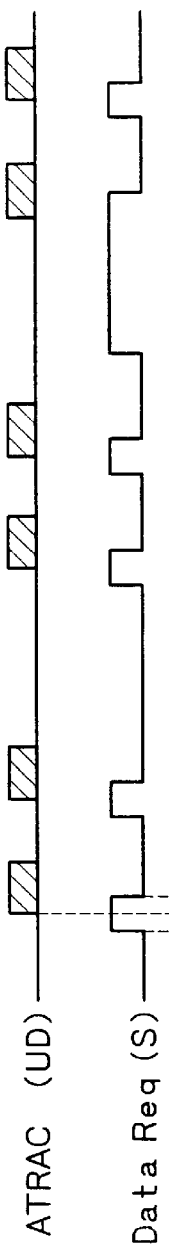
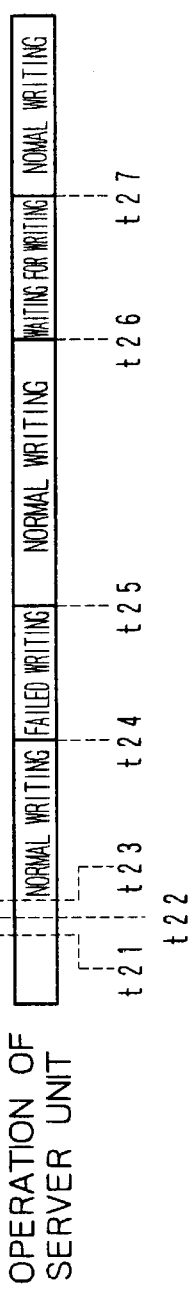
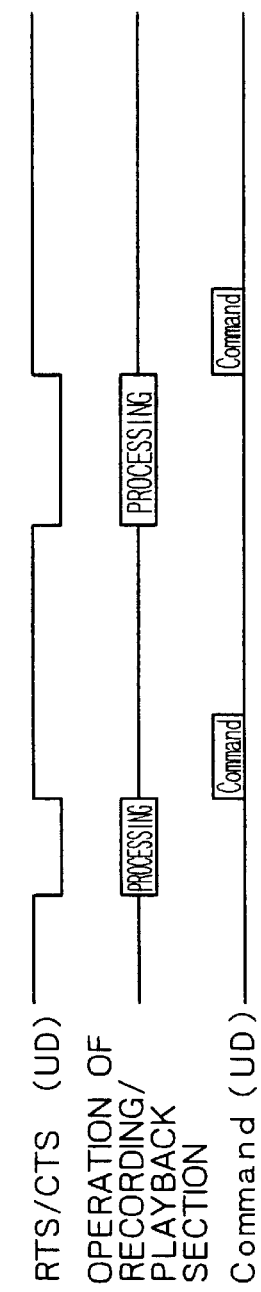
FIG. 17A ATRAC (UD)
FIG. 17B Data Req (S)
FIG. 17C OPERATION OF SERVER UNIT
FIG. 17D Command (S)
FIG. 17E RTS/CTS (UD)
FIG. 17F OPERATION OF RECORDING/ PLAYBACK SECTION
FIG. 17G Command (UD)
FIG. 17H RTS/CTS (S)
FIG. 17I OPERATION OF SERVER UNIT
INTERFACE UPON UPLOADING

FIG.21

DISPLAY OF REGISTERED TUNE LIST

| TITLE | LENGTH OF TUNE | REGISTERING PERSON | REGISTRATION DATE | NUMBER OF DOWNLOAD TIMES | AMOUNT OF MONEY |
|---|---|---|---|---|---|
| BYE BYE | 3 MIN. AND 12 SEC. | TARO | 97/05/27 | 120 | ¥400 |
| HELLO | 9 MIN. AND 45 SEC. | JIRO | 97/05/29 | 10 | ¥1,100 |
| MORNING | 5 MIN. AND 11 SEC. | ICHIRO | 97/06/03 | 15 | ¥100 |
| ...... | ...... | ...... | ...... | ...... | ...... |

FIG. 22B

DISC D

```
TNO Title    trmd  Track Size
Tr1 Emotion  e6    0011. 05. 02
Tr2 Dream    e6    0022. 1f. 0a
```

FIG. 22A

SERVER

```
   Title    trmd  Track Size
#1 ByeBye   a6    0002. 00. 00
#2 Hello    a6    0010. 2f. 0a
#3 Morning  86    0020. 1e. 00
           ......
```

DOWNLOAD OF #2, #3

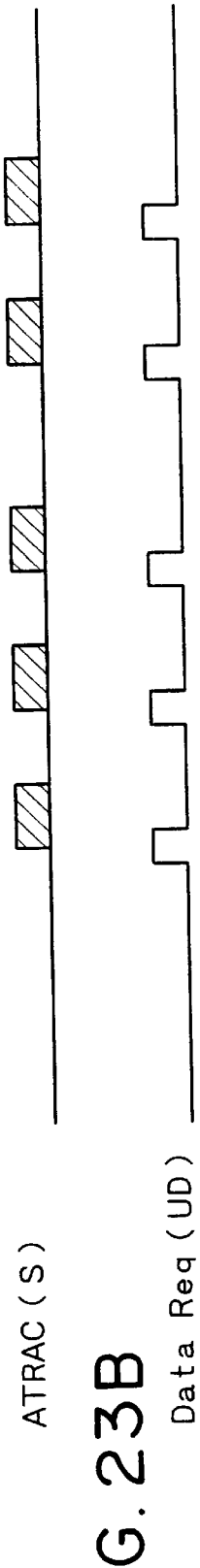
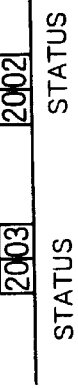
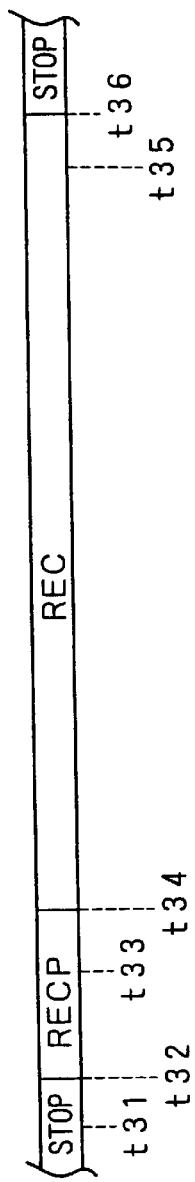
FIG. 23A ATRAC(S)
FIG. 23B Data Req(UD)
FIG. 23C Command(S)
FIG. 23D Command(UD)
FIG. 23E STATE OF RECORDING/PLAYBACK SECTION

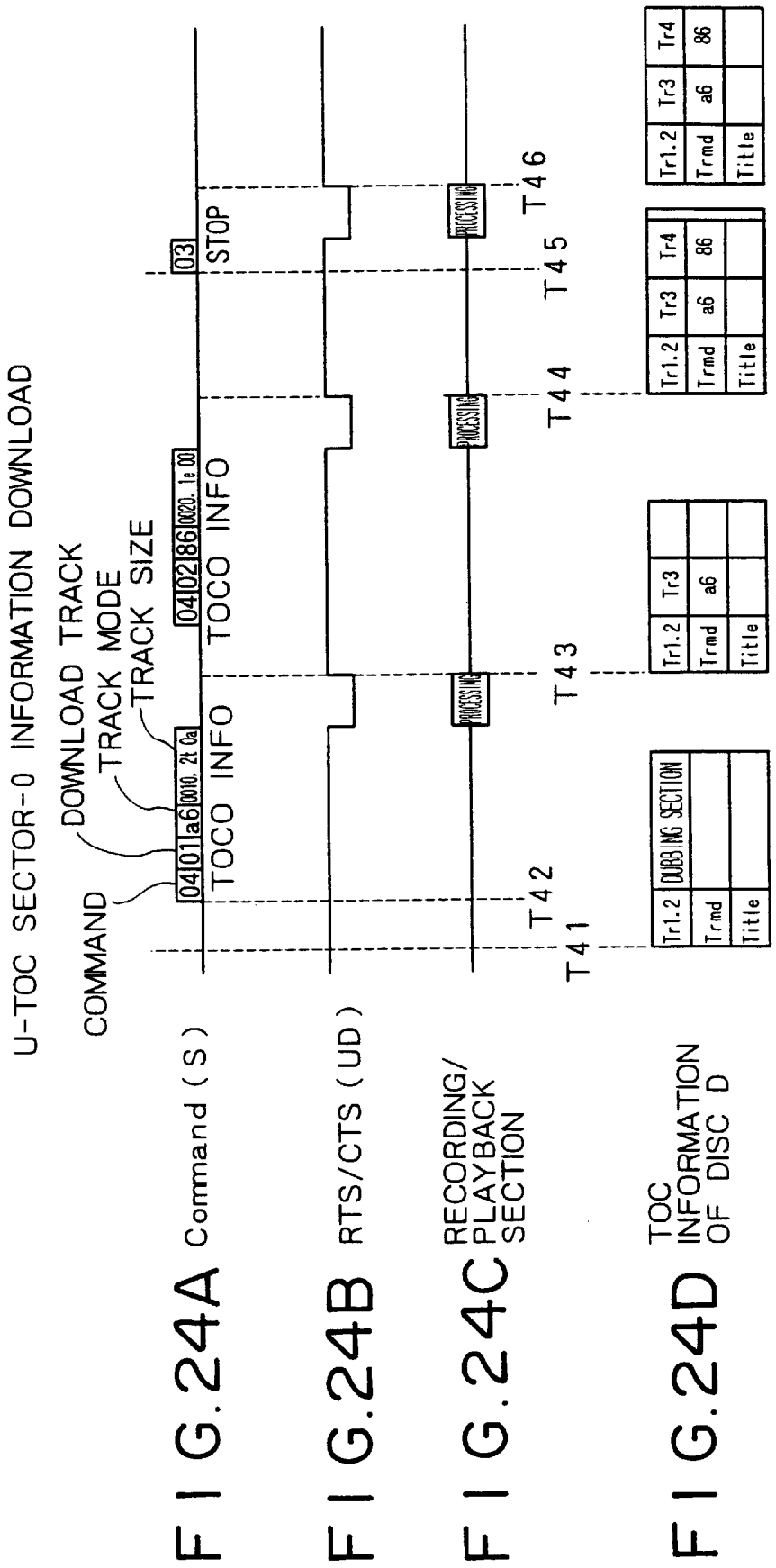

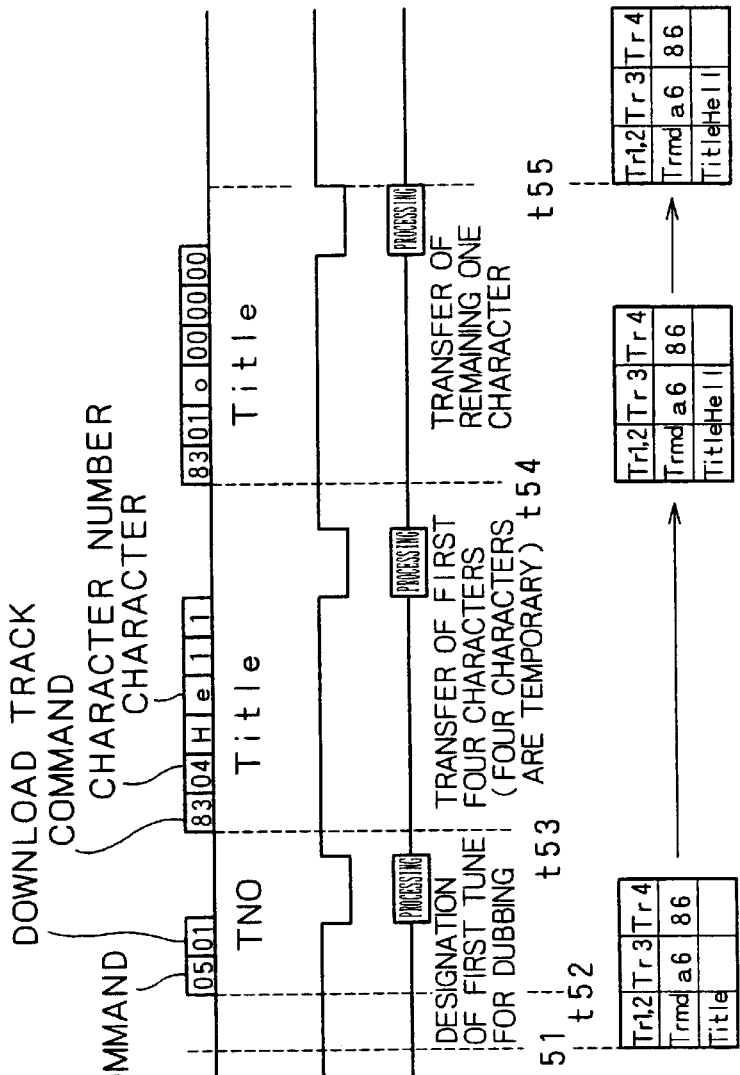

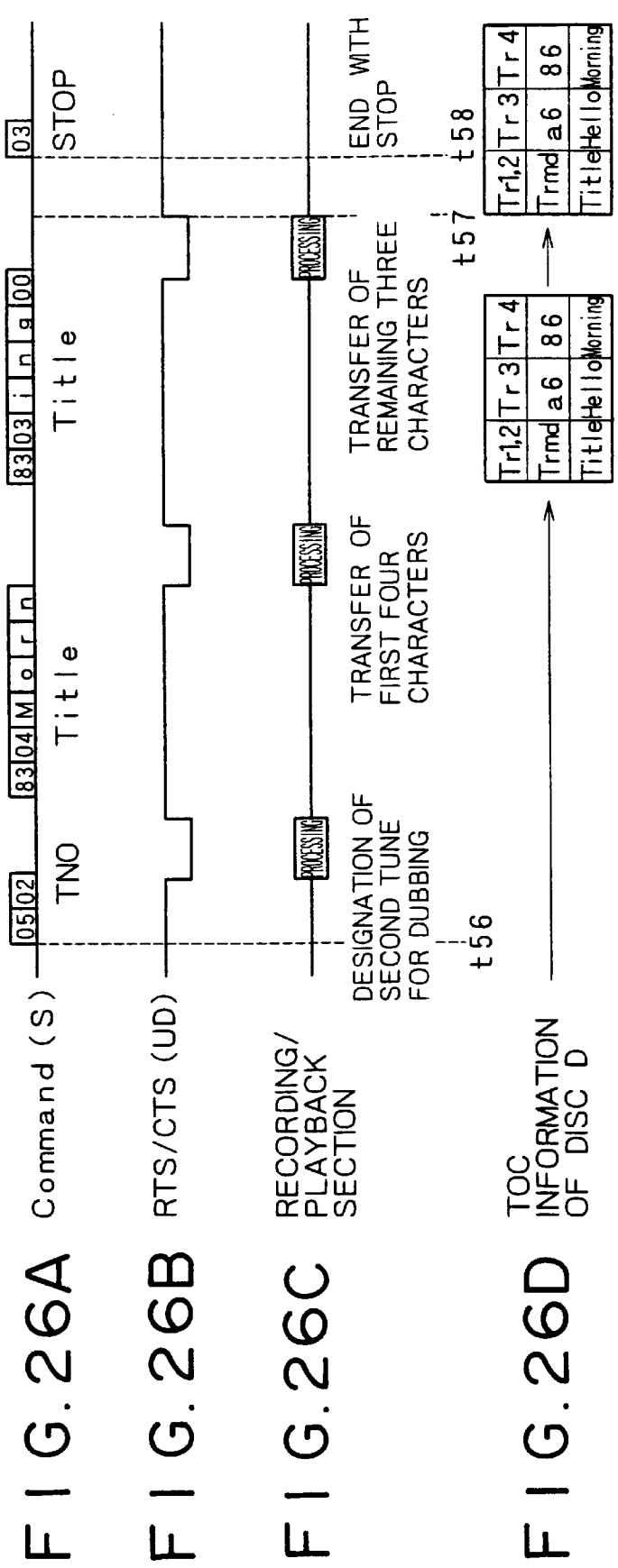

FIG.27

| TNO Title | trmd | Track Size |
|---|---|---|
| Tr1 Emotion | e6 | 0011.05.02 |
| Tr2 Dream | e6 | 0022.1f.0a |
| Tr3 Hello | e6 | 0010.2f.0a |
| Tr4 Morning | 86 | 0020.1e.00 |

FIG.28B

DISC D

| TNO | Title | trmd | Track Size |
|---|---|---|---|
| Tr1 | Woman | e6 | 0010.05.03 |
| Tr2 | Street | e6 | 0012.10.3e |
| Tr3 | Night | 86 | 0021.1e.06 |

FIG.28A

SERVER

| | Title | trmd | Track Size |
|---|---|---|---|
| #1 | ByeBye | a6 | 0002.00.00 |
| #2 | Hello | a6 | 0010.2f.0a |
| #3 | Morning | 86 | 0020.1e.00 |
| | ...... | | |

UPLOAD OF Tr2, Tr 3

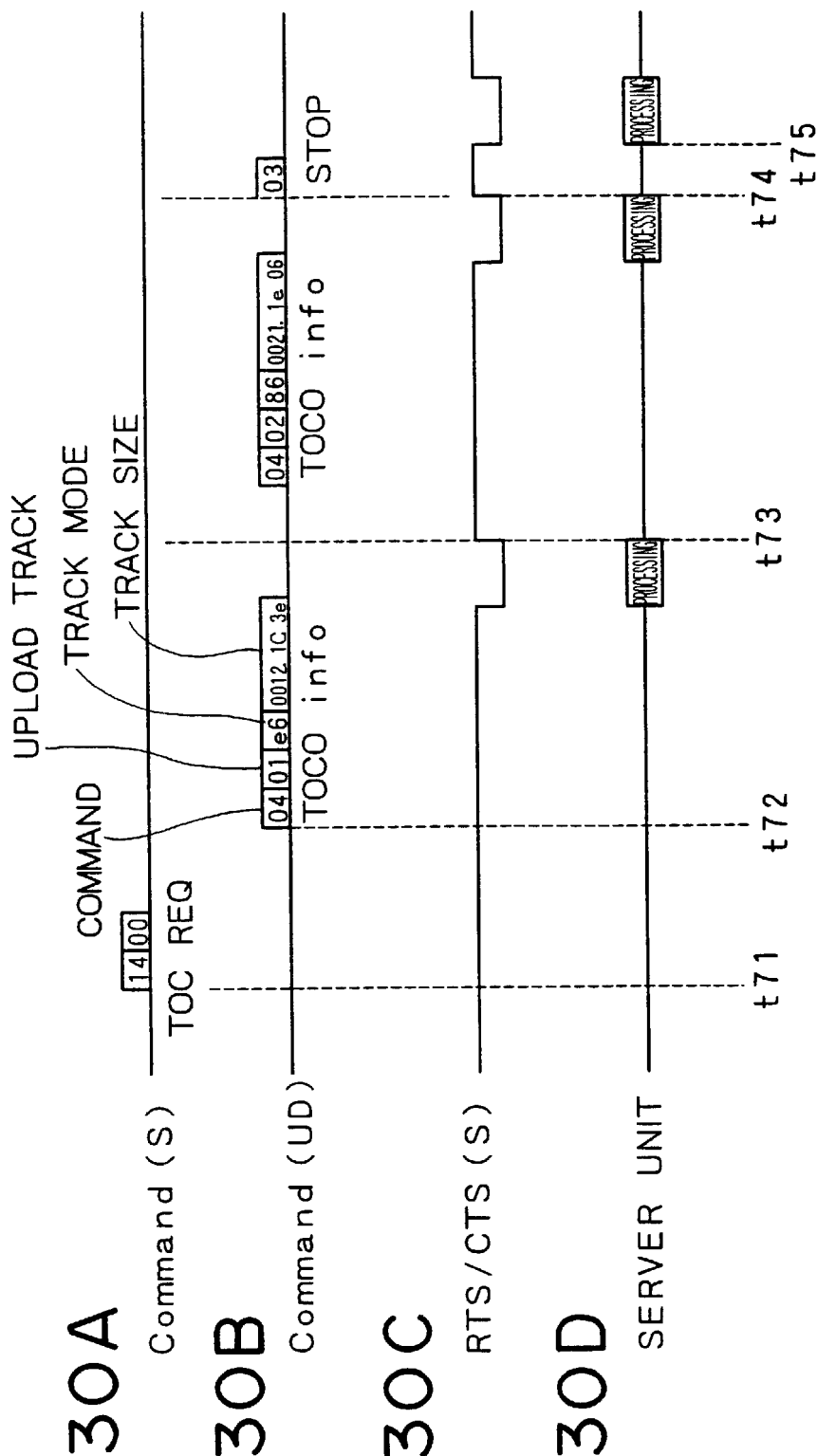

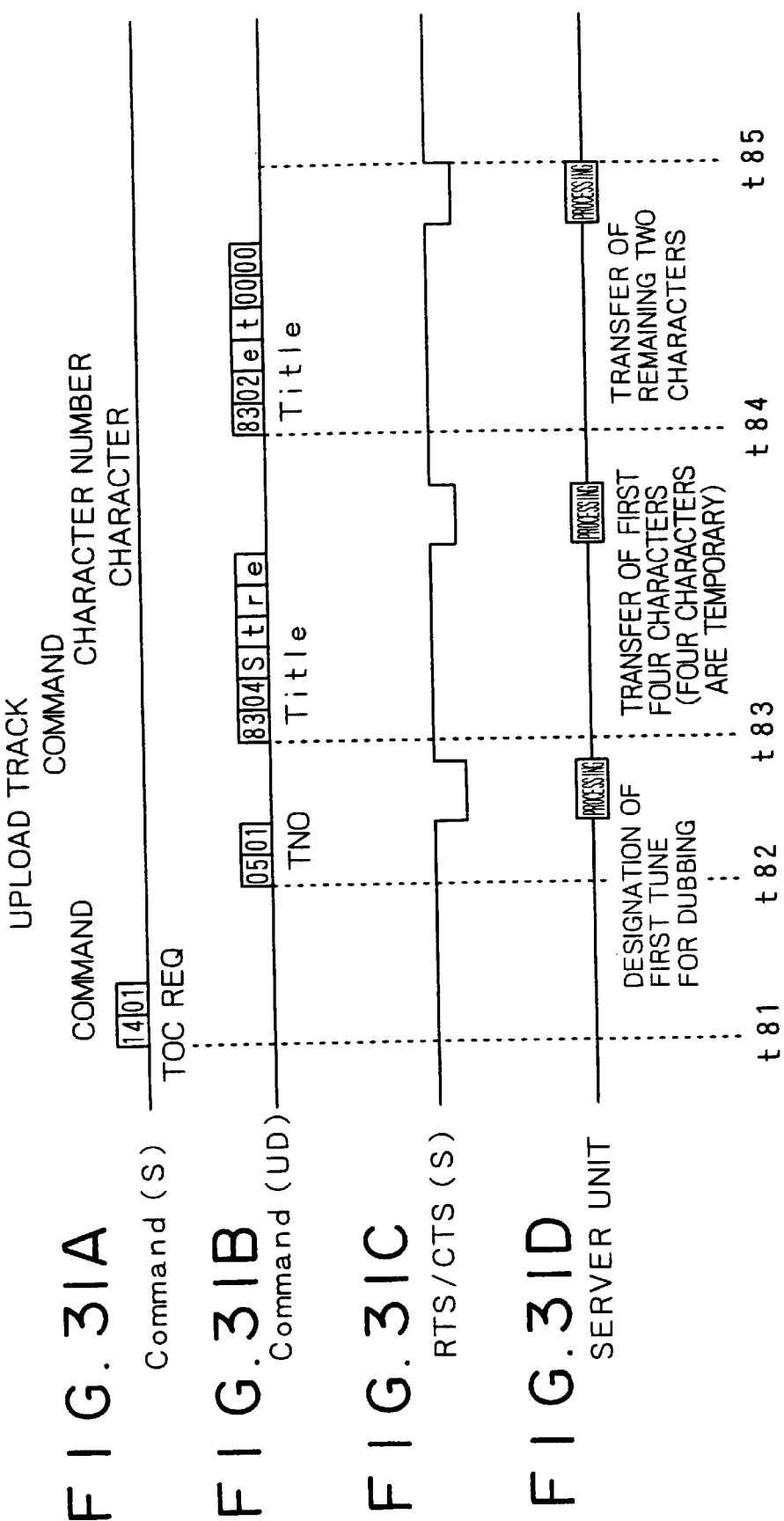

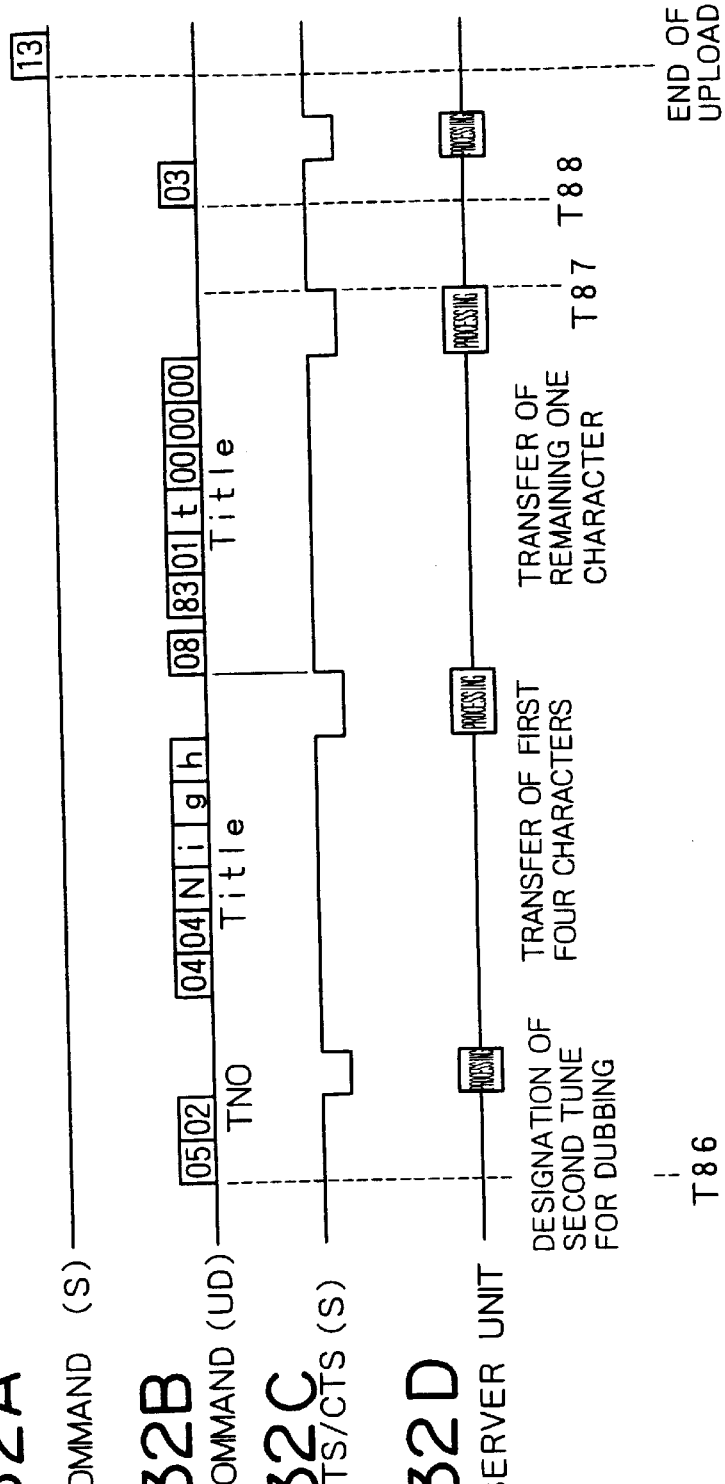

FIG. 33

| CONTENTS No. | USER NAME | PASSWORD | TITLE | ATRAC DATA | CHARACTER DATA | IMAGE DATA | NUMBER OF DOWNLOAD TIMES | NUMBER OF UNPAID TIMES | URL | AMOUNT | REGISTRATION DATE |
|---|---|---|---|---|---|---|---|---|---|---|---|
| #1 | Taro | rsfskjhk | Bye Bye | #1.atc | #1.txt | #1.gif | 120 | 20 | http://www xxx.....#1 | ¥300 | 97.8.1 |
| #2 | Jiro | lsk?ls: | Hello | #2.atc | #2.txt | — | 10 | 0 | http://www xxx.....#2 | ¥1000 | 97.8.2 |
| #3 | Ichiro | sslsrgh | Morning | #3.atc | — | #3.gif | 15 | — | — | Free | 97.8.5 |
| ...... | ...... | ...... | ...... | ...... | ...... | ...... | ...... | ...... | ...... | ...... | ...... |
| #m | Saburo | d12d00:2 | Street | #m.atc | #m.txt | #m.gif | 0 | 0 | http://www xxx...Sabu | ¥500 | 97.8.15 |
| #m+1 | Saburo | d12d00:2 | Night | #m+1.atc | #m+1.txt | #m+1.gif | 0 | 0 | http://www xxx...Sabu | ¥600 | 97.8.15 |

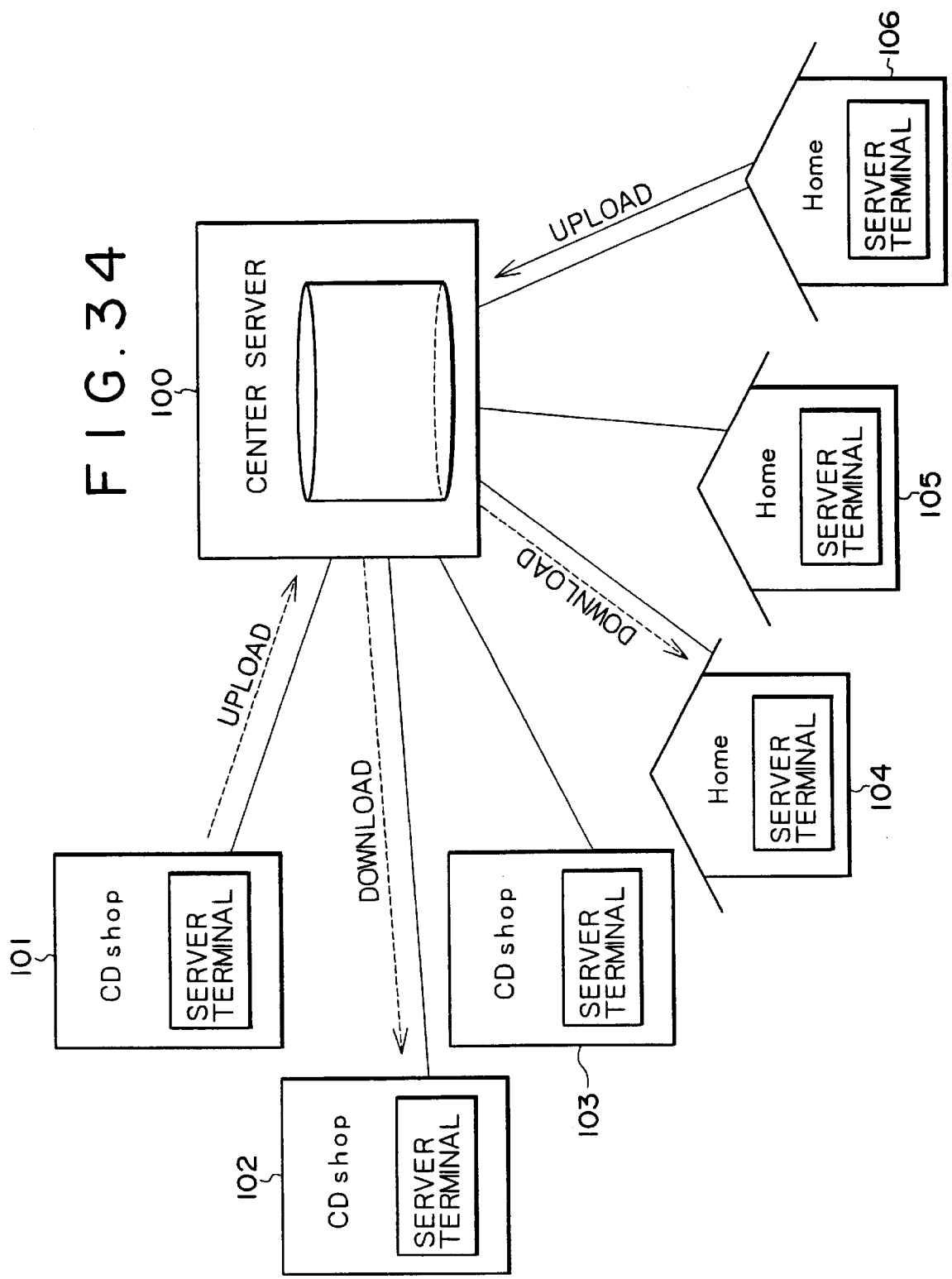

DATA TRANSMITTING AND RECEIVING SYSTEM

BACKGROUND OF THE INVENTION

This invention relates to a data transmitting and receiving system which can upload data recorded on a recording medium loaded on the client side from the recording medium to the server side and can download audio data and so forth from the server side to the recording medium.

As a recording medium which allows recording and playback, a magneto-optical disc called a mini disc (trademark) which is a recording medium in the form of a disc of a diameter of approximately 64 mm accommodated in a cartridge is known.

The magneto-optical disc allows recording thereon of audio data for approximately 74 minutes in stereo using an adaptive transform acoustic coding system (ATRAC) as an audio compression system.

The magneto-optical disc can be carried outdoors readily since it is small in size and easy to carry. Further, since the magneto-optical disc is different from a conventional digital audio disc called a compact disc (trademark) in that it allows recording thereon, it allows duplication of audio data thereof.

By the way, in order to record audio data compressed to approximately one fifth (1/5) onto a magneto-optical disc, an audio server system may be constructed such that the compressed audio data are stored as they are into the server side, and the data are transmitted to the client side without intervention of any decoder or any encoder for the compression processing so that they may be downloaded onto a magneto-optical disc loaded on the client side.

In the audio server system, since compressed data are recorded as they are without being decompressed, the time required for recording can be reduced comparing with that for recording where compression processing is performed after decompression processing is performed.

If the audio server system is constructed such that a magneto-optical disc carried in by a user can be loaded into it and one program or a plurality of programs recorded as audio data in the server can be duplicated onto the magneto-optical disc, then new sales/service forms of musical programs or the like different from those of package media such as a CD (compact disc) can be realized.

However, musical contents provided by such an audio server system as described above are provided one-sidedly from a record company, and common users are in a passive situation.

Some of common users which make use of such an audio server system as described above possibly have a music writing or lyric writing ability, and provision for such people with a place where such an ability can be made public or sold will provide an opportunity of self-appealing.

SUMMARY OF THE INVENTION

It is an object of the present invention to provide a data transmitting and receiving system which allows a common user to act beyond a position in which the user merely receives information provided by the system.

In order to attain the object described above, according to an aspect of the present invention, there is provided a data transmitting and receiving system connected to an information center for transmitting and receiving data to and from the information center, comprising loading means into which a recording medium on which content data produced by a user are recorded can be loaded, playback means for playing back the content data produced by the user and stored on the recording medium, transmission means for transmitting the content data played back by the playback means and management information regarding the content data, selection means for selecting desired data from a large capacity storage in the information center, reception means for receiving the desired data selected by the selection means and the management information of the desired data transmitted thereto from the information center, and recording means for recording the data and the management information received by the reception means and recording the received data and management information onto the recording medium loaded in the loading means.

According to another aspect of the present invention, there is provided an information center having at least one terminal equipment connected thereto for communicating data with the terminal equipment, comprising memory means for storing a plurality of content data therein, transmission means for adding, to that one of the content data stored in the memory means which is selected by the terminal equipment side, management information for the one content data and transmitting the resulting data to the terminal equipment, and reception means for receiving content data and management information regarding the content data produced on and transmitted from the terminal equipment side, and wherein the content data are arranged based on the management information received by the reception means and stored into the memory means.

The above and other objects, features and advantages of the present invention will become apparent from the following description and the appended claims, taken in conjunction with the accompanying drawings in which like parts or are elements are denoted by like reference symbols.

BRIEF DESCRIPTION OF THE DRAWINGS

FIG. 2 is a table illustrating a file structure stored in a server of the audio server system of FIG. 1;

FIG. 5A is a diagrammatic view of a data structure illustrating a cluster of data recorded onto a magneto-optical disc by the audio server system shown in FIG. 1;

FIG. 5B is a diagrammatic view of a data structure illustrating a sector included in the cluster shown in FIG. 5A;

FIG. 5C is a diagrammatic view of a data structure illustrating a sound frame where 11 sound groups are formed from two sectors;

FIG. 5D is a diagrammatic view of a data structure where one sound group illustrated in FIG. 5C includes 2-channal data for the right channel and the left channel;

FIG. 6 is a table of a data structure illustrating the U-TOC sector 0 which is a management area of a magneto-optical disc used in the audio server system shown in FIG. 1;

FIG. 10 is a table of a data structure illustrating the U-TOC sector 1 which is another management area of the magneto-optical disc used in the audio server system shown in FIG. 1;

FIG. 11 is a table of a data structure illustrating the U-TOC sector 2 which is a further management area of the magneto-optical disc used in the audio server system shown in FIG. 1;

FIG. 12 is a table of a data structure illustrating the U-TOC sector 4 which is a still further management area of the magneto-optical disc used in the audio server system shown in FIG. 1;

FIG. 17A is a timing chart illustrating ATRAC data (ATRAC(UD)) transmitted from the recording and playback section on the client side to the server unit side shown in FIG. 16;

FIG. 17B is a timing chart illustrating data request data (DATA Req(s)) transmitted from the server unit side to the recording and playback section on the client side;

FIG. 17C is a timing chart illustrating a timing of recording by the server unit shown in FIG. 16;

FIG. 17D is a timing chart of command data (Command (S)) transmitted from the server unit side to the recording and playback section on the client side shown in FIG. 16;

FIG. 17E is a timing chart of an RTS/CTS signal (RTS/CTS(UD)) for confirmation of a processing condition transmitted from the recording and playback section on the client side to the server unit side;

FIG. 17F is a timing chart illustrating a timing of processing by the recording and playback section shown in FIG. 16;

FIG. 17G is a timing chart of command data (Command (UD)) transmitted from the recording and playback section on the client side to the server unit side shown in FIG. 16;

FIG. 17H is a timing chart of an RTS/CTS signal (RTS/CTS(S)) for confirmation of a processing condition transmitted from the server unit side to the recording and playback section on the client side shown in FIG. 16;

FIG. 17I is a timing chart illustrating a timing of processing by the server unit side;

FIG. 21 is a table illustrating an example of a list display of tunes registered in the server shown in FIG. 13;

FIG. 22A is a schematic view showing a list of programs provided by the server unit shown in FIG. 16 prior to downloading;

FIG. 22B is a schematic view showing a list of programs recorded in advance on a disc loaded in the recording and playback section on the client side shown in FIG. 16 prior to downloading;

FIG. 23A is a timing chart of ATRAC data (ATRAC(S)) transmitted from the server unit side to the recording and playback section on the client side shown in FIG. 16;

FIG. 23B is a timing chart of data request data (DATA Req(UD)) transmitted from the recording and playback section on the client side to the server unit side shown in FIG. 16;

FIG. 23C is a timing chart of command data (Command (S)) transmitted from the server unit side to the recording and playback section on the client side shown in FIG. 16;

FIG. 23D is a timing chart of command data (Command (UD)) transmitted from the recording and playback section on the client side to the server unit side shown in FIG. 16;

FIG. 23E is a timing chart illustrating a control condition of the recording and playback section on the client side shown in FIG. 16 upon downloading;

FIG. 24A is a timing chart of command data (Command (S)) transmitted from the server unit side to the recording and playback section on the client side shown in FIG. 16 when information of the U-TOC sector 0 which is management information is updated;

FIG. 24B is a timing chart of an RTS/CTS signal (RTS/CTS(UD)) for confirmation of a processing condition transmitted from the recording and playback section on the client side to the server unit side shown in FIG. 16;

FIG. 24C is a timing chart illustrating a timing of processing by the recording and playback section shown in FIG. 16;

FIG. 24D is a timing chart illustrating an updating condition of information of the U-TOC sector 0 which is management information of a magneto-optical disc;

FIG. 25A is a timing chart of command data (Command (S)) transmitted from the server unit side to the recording and playback section on the client side shown in FIG. 16 when information of the U-TOC sector 1 which is management information is updated;

FIG. 25B is a timing chart of an RTS/CTS signal (RTS/CTS(UD)) for confirmation of a processing condition transmitted from the recording and playback section on the client side to the server unit side shown in FIG. 16;

FIG. 25C is a timing chart illustrating a timing of processing by the recording and playback section shown in FIG. 16;

FIG. 25D is a timing chart an updating condition of information of the U-TOC sector 1 which is management information of a magneto-optical disc;

FIG. 26A is a timing chart of command data (Command (S)) transmitted from the server unit side to the recording and playback section on the client side shown in FIG. 16 when information of the U-TOC sector 1 which is management information is updated;

FIG. 26B is a timing chart of an RTS/CTS signal (RTS/CTS(UD)) for confirmation of a processing condition transmitted from the recording and playback section on the client side to the server unit side shown in FIG. 16;

FIG. 26C is a timing chart illustrating a timing of processing by the recording and playback section shown in FIG. 16;

FIG. 26D is a timing chart illustrating an updating condition of information of the U-TOC sector 1 which is management information of a magneto-optical disc;

FIG. 27 is a diagrammatic view illustrating a list of programs recorded on a magneto-optical disc after downloading;

FIG. 28A is a diagrammatic view illustrating a list of programs stored in the server unit side shown in FIG. 13 prior to uploading;

FIG. 28B is a diagrammatic view illustrating a list of programs recorded on a disc loaded in the recording and playback section on the client side shown in FIG. 13 prior to uploading;

FIG. 29A is a timing chart of ATRAC data (ATRAC(S)) transmitted from the server unit side to the recording and playback section on the client side shown in FIG. 16;

FIG. 29B is a timing chart of data request data (DATA Req(UD)) transmitted from the recording and playback section on the client side to the server unit side shown in FIG. 16;

FIG. 29C is a timing chart of command data (Command (S)) transmitted from the server unit side to the recording and playback section on the client side shown in FIG. 16;

FIG. 29D is a timing chart of command data Command (UD)) transmitted from the recording and playback section on the client side to the server unit side shown in FIG. 16;

FIG. 29E is a timing chart illustrating a control condition of the recording and playback section on the client side shown in FIG. 16 upon uploading;

FIG. 30A is a timing chart illustrating command data (Command(S)) transmitted from the server unit side to the recording and playback section on the client side shown in FIG. 16 when information of the U-TOC sector 0 which is management information is updated;

FIG. 30B is a timing chart illustrating command data (Command(UD)) transmitted from the recording and playback section on the client side to the server unit side shown in FIG. 16 when information of the U-TOC sector 0 which is management information is updated;

FIG. 30C is a timing chart of an RTS/CTS signal (RTS/CTS(S)) for confirmation of a processing condition transmitted from the server unit side to the recording and playback section on the client side shown in FIG. 16;

FIG. 30D is a timing chart illustrating a timing of processing by the server unit shown in FIG. 16;

FIG. 31A is a timing chart illustrating command data (Command(S)) transmitted from the server unit side to the recording and playback section on the client side shown in FIG. 16 when information of the U-TOC sector 1 which is management information is uploaded;

FIG. 31B is a timing chart illustrating command data (Command(UD)) transmitted from the recording and playback section on the client side to the server unit side shown in FIG. 16 when information of the U-TOC sector 1 which is management information is uploaded;

FIG. 31C is a timing chart of an RTS/CTS signal (RTS/CTS(S)) for confirmation of a processing condition transmitted from the recording and playback section on the client side to the server unit side shown in FIG. 16;

FIG. 31D is a timing chart illustrating a timing of processing by the server unit shown in FIG. 16;

FIG. 32A is a timing chart illustrating command data (Command(S)) transmitted from the server unit side to the recording and playback section on the client side shown in FIG. 16 when information of the U-TOC sector 1 which is management information is uploaded;

FIG. 32B is a timing chart illustrating command data (Command(UD)) transmitted from the recording and playback section on the client side to the server unit side shown in FIG. 16 when information of the U-TOC sector 1 which is management information is uploaded;

FIG. 32C is a timing chart of an RTS/CTS signal (RTS/CTS(S)) for confirmation of a processing condition transmitted from the recording and playback section on the client side to the server unit side shown in FIG. 16;

FIG. 32D is a timing chart illustrating a timing of processing by the server unit shown in FIG. 16;

FIG. 33 is a table illustrating a management condition of the inside of a hard disc in the server unit after uploading; and FIG. 34 is a diagrammatic view illustrating the audio server system of FIG. 1 where a communication network is utilized.

DETAILED DESCRIPTION OF THE PREFERRED EMBODIMENT

Figure 1:
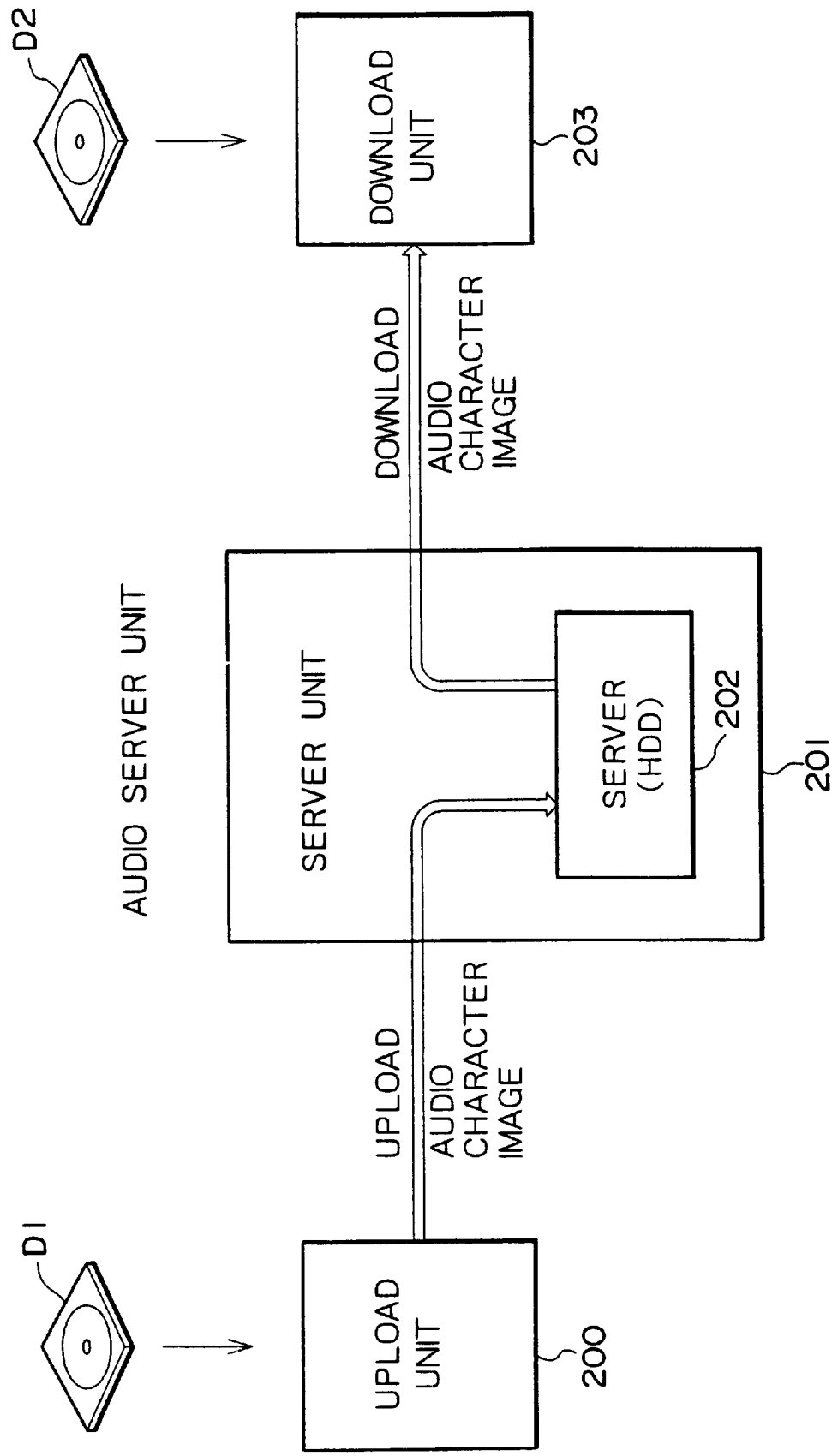
FIG. 1 is a block diagram showing an audio server system to which the present invention is applied.

In the following, an audio server system which is constructed making use of a mini disc system as a preferred embodiment of the present invention is described in the following order.

1. Concept of construction of audio server system
2. Construction of audio server system
3. Cluster format of mini disc
4. U-TOC
5. Data transmission system for upload/download
6. Upload/download processing
7. Example of download operation
8. Example of upload operation
9. Audio server system employing network 1. Concept of Construction of Audio Server System First, a concept of a construction of an audio server system to which the present invention is applied is described with reference to FIGS. 1 and 2.

FIG. 1 illustrates a concept of the audio server system. Referring to FIG. 1, the audio server system includes an upload unit 200, a server unit 201 and a download unit 203 as basic components thereof.

The upload unit 200 has a function of playing back audio data and character information, image information, management information and some other information incidental to the audio data recorded on, for example, a mini disc (magneto-optical disc) D1 which is used with a mini disc system.

The server unit 201 includes a server 202 formed from, for example, a hard disc drive or the like and can store a large number of musical programs as audio data and store various information incidental to the programs.

The download unit 203 has a function of recording audio data and character information, image information, management information and some other information incidental to the audio data onto a mini disc (magneto-optical disc) D2 which is used with a mini disc system.

It is to be noted that the upload unit 200 and the download unit 203 can be formed in a unitary member as, for example, a mini disc recording and playback apparatus. As a concrete example of a construction of the data transmitting and receiving system, an example wherein a recording and playback section having both of the upload unit 200 and the download unit 203 is employed is hereinafter described.

The upload unit 200 and the server unit 201 have an interface for audio data and another interface for various commands, incidental information and so forth built therein so that audio data and incidental information played back from the disc D1 can be uploaded by the upload unit 200 to the server 202.

Also the download unit 203 and the server unit 201 have an interface for audio data and another interface for various commands, incidental information and so forth built therein so that audio data and incidental information stored in the server 202 can be transmitted to the download unit 203 to allow the download unit 203 to record them onto the disc D2 to execute downloading.

In particular, in the audio server system, a certain user can load a disc D1 carried by the user into the upload unit 200 and upload a musical program composed by the user and recorded on the disc D1 in advance into the server 202.

Incidentally to the musical program and so forth, also character information or image information as relating information to the musical program can be uploaded into the server unit 201.

Further, another certain user can carry a recordable disc D2, load it into the download unit 203, select a desired musical program or the like from among musical programs stored in the server 202 and duplicate the selected musical program onto the disc D2 to effect downloading.

In this instance, not only audio data, but also character information and/or image information stored incidentally to the audio data can be downloaded.

With the audio server system described above, a user can provide (upload) information (a musical program or the like) owned by the user itself to many and unspecified persons.

Further, a user can obtain information stored in the server 202 with or without charge.

In the server 202, upload information is stored in such a file structure, for example, in FIG. 2. It is to be noted that the structure illustrated in FIG. 2 is a mere example.

For example, a piece of uploaded information is stored as a content. For convenience of description, content numbers #1, #2, . . . , #n are individually applied to the contents.

For each content, the user name of a user who has uploaded it is registered first. Further, a password of the user (or for each content) is registered. Further, as the contents of actual data, audio data of a musical program or the like (audio data according to the ATRAC compression system, which may be hereinafter referred to as ATRAC data) are stored together with its title (name of the musical program or the like).

Further, if character data (text data) or image data (bit map data or compressed image data) are uploaded incidentally to the ATRAC data, then they are stored in a corresponding relationship.

It is to be noted that, for convenience of description, in order to identify ATRAC data, character data and image data, they are represented with a suffix added to each content number #n like "#n. atc", "#n. txt" and "#n. gif", respectively.

The character data are information produced arbitrarily by an upload user such as, for example, the words of a musical program, a lyric writer and a composer, a player, a message, an interpretation and other personal information.

The image data are also information produced arbitrarily by an upload user such as an image picture regarding the musical program, a photograph picture of the upload user or the like.

Further, in the server 202, the number of download operations which makes information of downloading incidental to the uploaded information is managed.

Further, when the upload user desires provision with charge, the situation of payment of the charge conforming to pertaining downloading is managed, for example, as a number of unpaid times.

Furthermore, also a URL (Uniform resource locator) address and so forth inputted when, upon uploading or the like, the upload user wants to present it on an internet home page of the user itself or the like is registered.

Further, also an amount of money to be received, for example, for one downloading operation is set and registered by inputting of the upload user or the like. Also the date on which the upload registration is performed is managed.

2. Construction of Audio Server System

As an example of a concrete construction of such an audio server system as described above, an audio server system 1 as an embodiment of the present invention is described.

Figure 3:
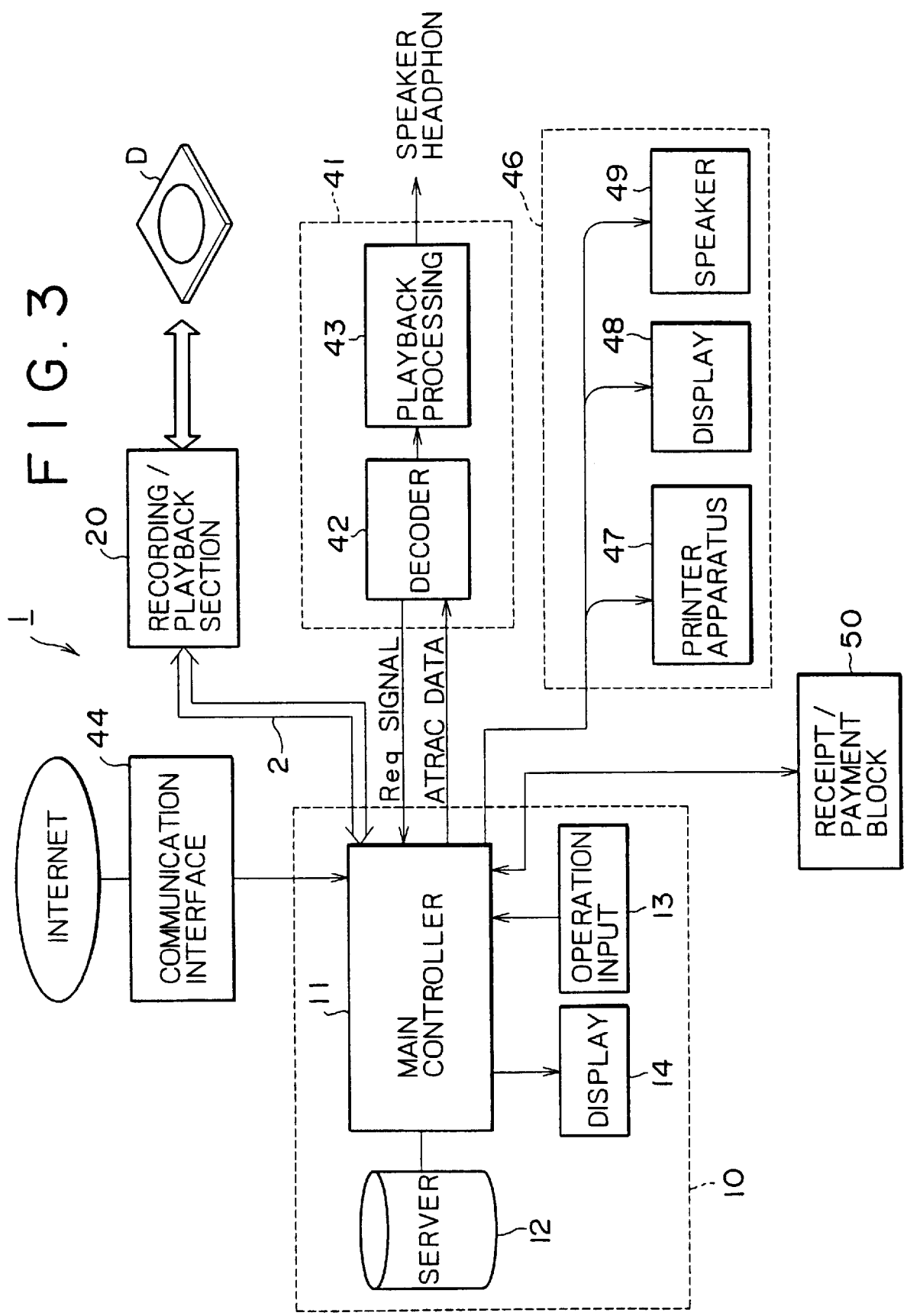
FIG. 3 is a detailed block diagram of the audio server system of FIG. 1.

FIG. 3 is a block diagram showing a construction of the audio server system 1.

Referring to FIG. 3, the audio server system 1 includes a server unit 10 and a recording and playback section 20 as basic components for performing uploading and downloading operations.

The server unit 10 includes a main controller 11, a server 12, an operation inputting section 13, a display section 14 and so forth.

The recording and playback section 20 has a function of recording and playing back audio data and so forth onto and from a disc D which is a portable recording medium.

The server unit 10 and the recording and playback section 20 are connected to each other by a connection cable 2. The connection cable 2 may be, for example, the IEEE1394 interface or the like.

The server 12 in the server unit 10 may be located at a remote place while an ISDN (integrated service digital network), a public network or the like is used as the transmission line between the main controller 11 and the server 12.

In the audio server system 1, a user stores audio data and so forth uploaded from a disc D loaded in the recording and playback section 20 to the server unit 10 side in such a file structure as described hereinabove with reference to FIG. 2.

Then, if a download user loads the disc D into the recording and playback section 20 and selects desired audio data from within the audio data stored in the server 12, then the audio data and so forth are transmitted to the recording and playback section 20 and downloaded onto the disc D.

The recording and playback section 20 corresponds to the upload unit 200 and the download unit 203 of FIG. 1, and the server unit 10 corresponds to the server unit 201 of FIG. 1 while the server 12 corresponds to the server 202 of FIG. 1.

In other words, the present audio server system 1 is constructed such that it does not provide a content (musical program or the like) in a form in which audio data are stored in such a medium as a compact disc or an audio tape, but provides a content of music to a download user in another form in which audio data are recorded on a recording medium (disc D) owned by the user.

For example, it is possible to locate the audio server system 1 in a station, a shop or the like such that a content of music is provided to a user with or without charge or to locate the audio server system 1 in a musical studio or the like so as to be used for management of contents.

Further, contents stored in the server can be provided (uploaded) arbitrarily and readily by many and unspecified users (upload users).

Accordingly, also information which cannot commonly be provided readily with a package medium such as a CD such as, for example, an original musical program of an amateur musician, can be provided readily to common users. Thus, an information providing system having a high degree of freedom can be implemented.

In the server 12 of the audio server system 1, contents of music of programs each for several minutes are uploaded and stored as audio data.

It is to be noted that the stored contents need not be those originating from uploading by a user, but may include, for example, musical programs up to the top 10s in the latest hit chart provided by a record company or the like.

The contents stored are recorded as data compressed by the ATRAC system described hereinabove.

A download user will confirm contents which are provided by the audio server system 1 on the display section 14 and select, if the user finds one or more desired contents, the content or contents using the operation inputting section 13. Then, the user will load a disc D owned by the user itself into the recording and playback section 20 and perform an operation for starting recording using the operation inputting section 13.

When the operation for starting recording is performed by the user, the main controller 11 of the server unit 10 supplies audio data of the predetermined content or contents from among the contents stored in the server 12 to the recording and playback section 20.

The recording and playback section 20 records the audio data supplied thereto from the server unit 10 into a blank area of the disc D.

Then, when the recording of the audio data of the contents desired by the user onto the disc D is completed, the audio server system 1 ends the provision of contents.

In the present embodiment, it is assumed that the disc D is a magneto-optical disc and ATRAC audio data whose amount is reduced to approximately ⅕ from that of original data are recorded onto the disc D.

Accordingly, a compressed signal of the audio data of the ATRAC system stored in the server 12 can be dubbing recorded directly onto the disc D from the server 12 without intervention of decoder and encoder circuits for compression and decompression processes, and since compressed data are recorded directly as they are, the time required for the dubbing recording is shorter than that where compressed audio data are decompressed and played back and then recorded.

Further, the user will carry in a disc D, which is owned by the user itself and on which a musical program or the like to be provided to the audio server system 1 is recorded, and load it into the recording and playback section 20. Then, the user will enter a track to be uploaded (the track is a unit of a musical program or the like recorded on the disc D) using the operation inputting section 13 and effect an operation for uploading.

When an operation for starting uploading is performed by the user, the main controller 11 of the server unit 10 instructs the recording and playback section 20 to effect playback and stores audio data and relating information played back by the recording and playback section 20 into the server 12.

Then, when the storage of the audio data and relating information of the track desired by the user from the disc D into the server 12 is completed, the audio server system 1 ends the uploading.

Also in this instance, audio data of the ATRAC system stored on the disc D can be stored into the server 12 without any intervention of decoder and encoder circuits for compression and decompression processes, and since compressed data are recorded as they are, the time required for the uploading is shorter than that where the audio data are decompressed and then compressed again to play back them and then recorded.

The audio server system 1 further includes a playback section 41, a relating information playback section 46, a communication interface 44 and a receipt/payment block 50 as shown in FIG. 3.

The playback section 41 includes a decoder 42, a playback processing section 43 and so forth.

The relating information playback section 46 includes a printer apparatus 47, a display apparatus 48, a speaker 49 and so forth.

The audio server system 1 can perform, in addition to downloading of audio data onto a disc D, various operations using the playback section 41, relating information playback section 46 and communication interface 44.

For example, audio data to be downloaded to a disc D can be played back by the playback section 41 and. outputted to the speaker or a headphone, or part of the audio data to be recorded can be monitored.

Further, relating information to audio data to be recorded is outputted from the relating information playback section 46.

In the playback section 41, the decoder 42 decompresses ATRAC data supplied thereto from the main controller 11 to produce audio data. The audio data are supplied from the decoder 42 to the playback processing section 43.

The playback processing section 43 performs a process of converting a digital signal into an analog signal, an amplification process and so forth to produce an analog audio signal.

The analog audio signal produced by the playback processing section 43 is supplied to the speaker, a headphone or the like so as to be outputted as an audio signal from the same.

By the playback section 41, for example, part of audio data being duplicated can be provided as a monitor signal to the user.

The communication interface 44 may be, for example, a modem, a terminal adapter for an ISDN (Integrated Service Digital Network) line or the like.

The main controller 11 can acquire image information, audio information, text information and so forth from a WWW (World Wide Web) site of the internet through the communication interface 44.

The printer apparatus 47 of the relating information playback section 46 prints out image information or text information supplied thereto from the main controller 11.

The display apparatus 48 displays image information or text information supplied thereto from the main controller 11.

It is to be noted that the display apparatus 48 may be common to the display section 14 of the server unit 10.

The speaker 49 outputs audio information supplied thereto from the main controller 11. It is to be noted that the speaker 49 may be common to a speaker or a headphone which outputs an audio signal outputted from the playback section 41.

In the server 12, ATRAC data of a plurality of contents uploaded in such a manner as described above are stored, and also photographs of producers corresponding to the contents, image data of image pictures of the musical programs and so forth, the words of the musical programs as the contents, character data representative of histories of the artists and so forth are stored.

Further, the server 12 may store therein URL addresses if home pages in which such photographs or moving pictures of the producers as described above can be accessed are available.

Thus, the main controller 11 can acquire image information or character information as relating information regarding an individual content and output it in the form of a print, a display image or an audio output from the relating information playback section 46 to provide it to a download user.

Further, in order to record a content selected by a download user onto a disc D, when the main controller 11 reads out ATRAC data from the server 12 and supplies them to the recording and playback section 20, the main controller 11 supplies ATRAC data of a predetermined portion from the ATRAC data of a track to be supplied to the recording and playback section 20 to the playback section 41.

This is intended to allow the user who downloads the recorded track to listen to the ATRAC data while the recording and playback section 20 performs recording of the ATRAC data.

It is to be noted, however, that, since the ATRAC data are in a condition compressed to approximately ⅕ from original data, it is impossible to effect playback over the overall area of the track while recording is proceeding, and the main controller 11 cuts out part of the ATRAC data being recorded and supplies them to the playback section 41.

For example, the main controller 11 cuts out a portion of the ATRAC data with which a digest of the program can be grasped such as a top portion or an end portion of the program, and supplies the cut out portion of the ATRAC data to the playback section 41.

The portion to be cut out is set in advance in the server 12. Further, data which do not have a direct relationship with the ATRAC data to be recorded may be supplied to the playback section 41 so as to be outputted as an audio output. For example, information of a new program which has no relationship to a content to be downloaded or the like may be provided.

Alternatively, a user who effects uploading may arbitrarily set, when uploading is to be performed, portions from which played back sound may be outputted so as to allow such digest playback as mentioned above such that a list of addresses of the portions to be played back is stored in the server.

Then, upon downloading, the portions designated by the user who has performed the uploading are played back and outputted by the playback section 41.

Generally, an original musical program or the like of a user who performs uploading in most cases is an unknown program, and accordingly, a user who tries to perform downloading in most cases wants to perform downloading after the user gets the program played once.

Therefore, the contents stored in the server 12 allow a user to get them played. In particular, a portion of a program from which a digest of the program can be grasped such as a top portion or an end portion of the program selected in response to an operation of the operation inputting section 13 or the entirety of the program is played back and then outputted by the playback section 41.

Consequently, a download user can correctly select a program or the like desired truly by the download user and download it onto a disc D of the user.

Further, monitoring playback outputting by the playback section 41 may be performed upon uploading.

In particular, upon uploading, the main controller 11 supplies part of the audio data stored in the server 12 (such as a top portion of a program) to the playback section 41 so as to be played back and monitored. Consequently, the upload user can confirm whether or not the desired musical program is uploaded correctly.

Naturally, also when image data or character data are uploaded, monitoring outputting of the same may be performed by the display apparatus 48.

The receipt/payment block 50 performs collection of charges from download users and payment of charges to users who have performed uploading.

For example, a user who has performed uploading can set an amount of money to be received in accordance with a download request for the uploaded content.

The server unit 10 manages a registered amount of money, for example, in a corresponding relationship to each content as seen from FIG. 2, and when a download request is received, the server unit 10 requests the user who wants to perform downloading for payment of a charge. It is to be noted that naturally there is no need of making the amount of money charged upon the user who wants to perform downloading coincide with the amount of money registered so as to be received by the user who has performed uploading of the content.

Further, the server unit 10 manages the number of download times performed for each content, and can pay to the upload user an amount of money calculated based on the number of download times and the registered amount of money desired to receive.

For example, if the user who has performed uploading periodically performs a payment requesting operation using the operation inputting section 13, then an amount of money based on the number of download times is paid from the receipt/payment block 50 to the user who has performed the uploading.

In this instance, the number of download times for which no amount of money has been paid as seen in FIG. 2 or the like is managed.

3. Cluster Format of Mini Disc

Here, as a recording medium (disc D) handled in the audio server system 1, a recordable and reproducible magneto-optical disc specified in a format called a "mini disc" is described.

A magneto-optical disc called a "mini disc" which is used as a disc D in the present embodiment is a recording medium in the form of a disc of a diameter of approximately 64 mm accommodated in a cartridge, and audio data for approximately 74 minutes can be recorded as stereo signals on the magneto-optical disc using, as an audio compression system, the ATRAC (Adaptive Transform Acoustic Coding) system.

Further, since the audio server system 1 downloads and records audio data compressed by the ATRAC system onto a disc D, audio data uploaded from the disc D to the server 12 upon uploading are stored in the compressed form of the ATRAC system in the audio server system 1.

In other words, upon uploading from the disc D to the server 12 and upon downloading from the server 12 to the disc D, audio data are all processed in the form of ATRAC compressed data.

Accordingly, the connection cable 2 which transmits audio data between the server unit 10 and the recording and playback section 20 transmits ATRAC data.

It is to be noted that the connection cable 2 transmits also command data such as control commands, TOC information of a disc D and so forth as hereinafter described.

The format of data of a disc D (mini disc) used in the audio server system 1 is described.

Figure 4:
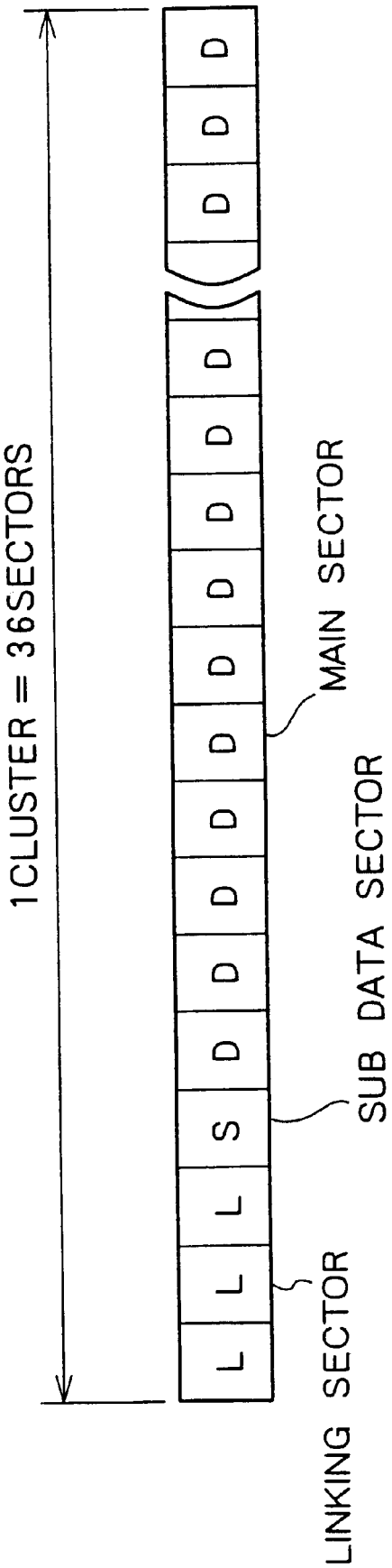
FIG. 4 is a diagrammatic view of a data structure illustrating a cluster of data recorded onto a magneto-optical disc by the audio server system shown in FIG. 1.

Data recorded on a disc D are managed in units called clusters as seen in FIG. 4. Data are written in units of an integral number of times the cluster onto the disc D. If the ATRAC data recorded in one cluster are reproduced, then an audio signal of approximately 2.04 seconds is obtained. As seen from FIG. 5A, one cluster is composed of totaling 36 sectors including three linking sectors, one sub data sector, and 32 main sectors (which are used for recording of audio data compressed by the ATRAC and TOC information).

It is to be noted that one sector is a unit composed of data of 2,352 bytes.

The linking sectors are allocated so that, since the format of the disc D employs error correction processing of the ACIRC (Advanced Cross Interleave Reed Solomon Code) system, interleaving of the error correction processing may be completed within the cluster. In other words, the linking sectors are dummy sectors inserted taking interleave in error correction processing into consideration so that rewriting of data can be performed in units of a cluster. The sub data sectors make a reserved area.

In the disc D, data of 424 bytes compressed by the ATRAC system are handled in units called sound groups as seen from FIG. 5C. In the sound group, data of 212 bytes are allocated for each of the left and right channels.

If data compressed in units of a sound group are decompressed, then they correspond to 512 samples of totaling two channels of the left channel and the right channel as seen from FIG. 5D. The data of 512 samples correspond to data of 2,048 bytes.

More particularly, 512 samples×16 bits×2 channels÷8 bits=2,048 bytes.

As seen from FIG. 5B, eleven sound groups form two sectors.

4. U-TOC

The recording area of the disc D is divided into a program area into which audio data compressed by the ATRAC system are recorded, a U-TOC (User Table of Contents) which is a management area in which management data for management of the audio data recorded in the program area are recorded, and a P-TOC (Pre-mastered Table of Contents) which is a read-in area.

With the disc D, even if actual musical data are not rewritten, erasure or editing of a program can be performed by rewriting information of the U-TOC. For example, if, with a disc D on which 5 programs are recorded, a start address and an end address of the third program are managed as a recordable area, then the third program cannot be played back any more.

In other words, when ATRAC data are recorded onto the disc D, also the U-TOC information must be rewritten simultaneously.

In the following, the U-TOC is described. It is to be noted that the unit of audio data recorded on the disc D is called a "track". This track is a unit of, for example, a music and is a unit corresponding to a content of a musical program stored in the audio server system 1 described above.

For the U-TOC of the disc D, 32 sectors from the U-TOC sector 0 to the U-TOC sector 31 can be used. Of those sectors, the sectors 0 to 4 are defined already. Thus, the sector 0, sector 1, sector 2 and sector 4 are described in detail.

FIG. 6 illustrates data recorded in the U-TOC sector 0. Here, the data recorded in the U-TOC sector 0 are delimited for each one byte, which is hereinafter referred to as slot for convenience of description. Each of the slots is represented by (xth row, yth column) given by a numerical value (x) from 0 to 587 in the direction of the axis of ordinate shown in FIG. 6 and a slot number (column number) from 1 to 4 from the left in the direction of the axis of abscissa. This also applies to the U-TOC sector 1 and so forth.

In the U-TOC sector 0, header data of 12 bytes are followed by "ClusterH", "ClusterL" and "Sector" representative of address information of the sector 0 recorded in 3 bytes from the slot (3rd row, 1st column). Further, in the slot (3rd row, 4th column), an identification code representative of a mini disc system is recorded as "Mode".

Further, beginning with the slot (7th row, 1st column), "Maker code" representative of a maker of the disc D, "Model code" representative of a model of the disc D, "First TNO" representative of the track number of the first track of the disc D, and "Last TNO" representative of the track number of the last track of the disc D are recorded successively.

Further, in the slot ("8th row, 4th column), "Used Sectors" representative of a situation of use of sectors is recorded, and in the slot ("10th row, 4th column), "Disc Serial No" representative of a serial number of the disc D is recorded.

Further, beginning with the slot (11th row, 1st column), "Disc ID" representative of the ID number of the disc D, "P-DFA (Pointer for defective area)" which is a pointer representative of a slot in which a start address of an area in which information of a defective address appearing on the disc D is recorded is recorded, "P-EMPTY (Pointer for empty slot)" which is a pointer representative of a situation of use of the slots, and "P-FRA (Pointer for freely area)" which is a pointer representative of a slot in which a start address of an area for management of the recordable area is stored, are recorded. Following them, "P-TNOn" which are pointers representative of slots in which start addresses of the tracks recorded on the disc D are recorded are recorded up to the slot (75th row, 4th column). Here, n indicate the track numbers of the tracks. n are represented by integers from 1 to 255.

Since "P-TNO0" to "P-TNO255" are prepared as the pointers P-TNOn for managing the tracks, 255 tracks to the maximum can be recorded on the disc D.

Further, beginning with the slot (78th row, 1st column), a start address, an end address, link information Link-P and a track mode (Track mode) of each track are recorded as a table of 8 bytes.

In the U-TOC sector 0, 255×4×2 slots (255 tables) in which the start addresses, end address and so forth are recorded are provided, and in a table indicated by a pointer corresponding to each track, the start address, end address and so forth of the track are recorded.

The value recorded in each of the pointers P-DFA, P-EMPTY and P-FRA mentioned above indicates one of the 255 tables.

Figure 7:
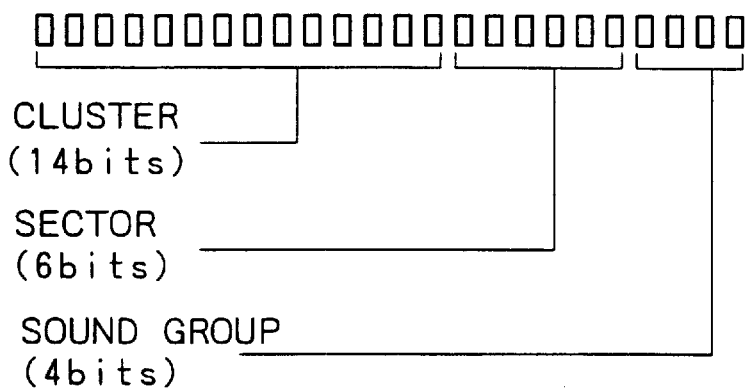
FIG. 7 is a diagrammatic view of a data structure illustrating a start address and an end address managed in the U-TOC sector 0 illustrated in FIG. 6.

The start address and the end addresses in each table are each represented by data of 3 bytes=24 bits as seen in FIG. 7. In the start address and the end address, a cluster address is recorded in the first 14 bits, a sector address is recorded in the following 6 bits, and an address of a sound group is recorded in the last 4 bits.

Figure 8:
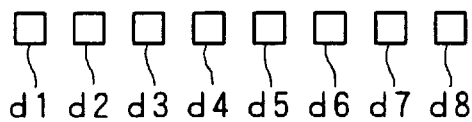
FIG. 8 is a diagrammatic view of a data structure illustrating a track mode managed in the U-TOC sector 0 illustrated in FIG. 6.

Further, the track mode (Track mode) is represented by data of 1 byte=8 bits as seen in FIG. 8.

In the track mode (Track mode), protect information of the record is recorded in the first bit; protect information of duplication is recorded in the second bit; generation information is recorded in the third bit; audio information is recorded in the fourth bit; an erasure storage information is recorded in the fifth and sixth bits; monaural or stereo information is recorded in the seventh bit; and emphasis information is recorded in the eighth bit.

In other words, in the track mode (Track mode), relating information unique to each track is recorded.

The link information P-Link is a pointer which indicates, where a same track is not recorded in a continuous data stream on the disc D, that is, where data of a same track are recorded discretely in the recording area of the disc D, beginning with which start address the next data are recorded.

For example, where, when a single track is played back, data beginning with the start address of the table of the slot (586th row, 1st column) must be played back succeeding the end address represented in the table of the slot (78th row, 1st column), the link information Link-P of the slot (80th row, 4th column) indicates the slot (586th row, 1st column).

In other words, where the disc D is employed, data need not necessarily be recorded in a continuous form on the recording medium, that is, data need not necessarily be recorded in a continuous data stream, but a sequential data train may be recorded discretely. Even if data are recorded discretely in this manner, since the continuity of data is indicated by the link information P-Link and, upon playback, data read out are written once into the memory at a writing rate higher than the reading out rate, the continuous data can be played back without being interrupted.

Further, even where data recorded already are overwritten with data shorter than the recorded program, the surplus portion can be designated as a recordable area (P-FRA) without being erased, thereby allowing efficient recording.

Figure 9:
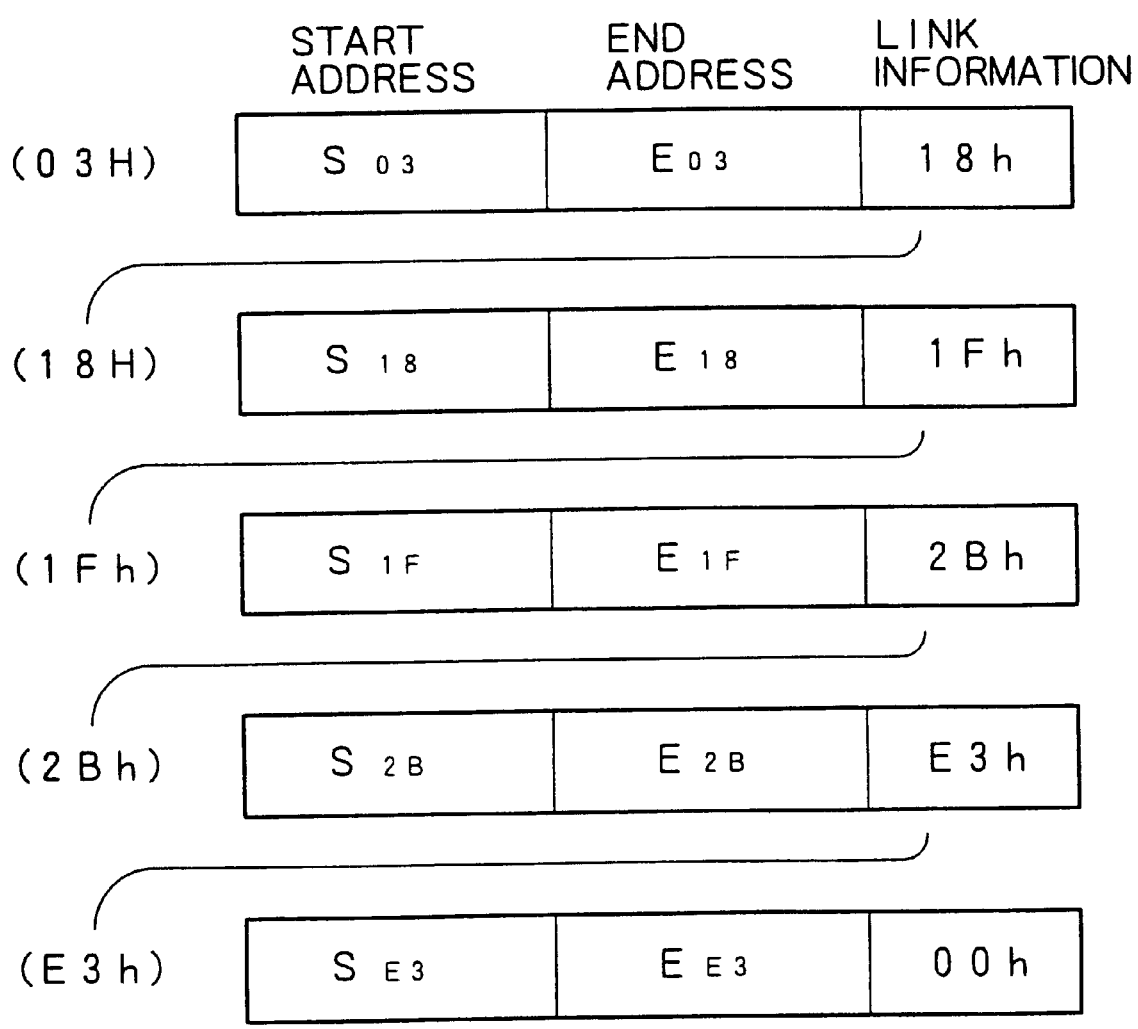
FIG. 9 is a diagrammatic view of a data structure illustrating a linked condition of slots in the U-TOC sector 0 illustrated in FIG. 6.

A coupling method of areas which are present discretely is described with reference to FIG. 9 using an example of the pointer P-FRA which indicates the recordable area.

If it is assumed that, for example, 03h (hexa-decimal) is recorded in the pointer P-FRA which indicates the top position of the slots which manage the recordable area of the U-TOC sector 0, then the slot corresponding to 03h is accessed first.

It is to be noted that the slot 03h points to an area (table) of 8 bytes beginning with the slot (82nd, 1st).

The value of a pointer points to a particular slot by predetermined calculation processing using the value.

In particular, where the value of the pointer is represented by "P", it indicates the byte position as 304+P×8. Accordingly, "03h" mentioned above points to 304+3×8= 328, and this corresponds to the byte position of the slot (82nd, 1st) (82×4=328).

Each pointer and link information designates a certain slot in this form.

Data of the start address and the end address recorded in the slot 03h indicate a start address and an end address of one part in a track recorded on the disc.

The link information recorded in the slot 03h indicates the number of a slot which should follow, and in this instance, 18h is recorded as the link information.

By tracing the link information recorded in the slot 18h, the slot 2Bh is accessed subsequently, and then by tracing the link information recorded in the slot 2Bh, the slot E3h is accessed. In this manner, the link information is successively traced until the data 00h appears as the link information. Sections each defined by a start address and an end address read in when each slot is accessed are all managed as the free area.

In this manner, the slots can be traced from a starting point given by a slot indicated by the pointer P-FRA until the link information of Null (=00h) is detected thereby to link the parts as the free area, which is present discretely on the disc, on the memory.

While the linkage is described above taking the pointer P-FRA as an example, parts which are present discretely can be linked in a similar manner also from each of the pointers P-DFA, F-EMPTY and P-TNO0 to P-TNO255. For example, with regard to the pointers P-TNO0 to P-TNO255, parts which are recorded discretely on the disc and form a single track can be linked on the memory.

Data recorded in the U-TOC sector 1 are illustrated in FIG. 10.

In the U-TOC sector 1, titles of the tracks recorded in the program area and a title of the entire disc are managed.

The title of the entire disc D is, where audio data are recorded on the tracks, information of the album title, a player or the like, and the title of each track corresponds to the name of a program.

Character information for the individual tracks is recorded in slots designated by the pointers P-TNAn (n ranges from 1 to 255 ) beginning with the slot (12th row, 2nd column), and where the number of characters is large, a plurality of slots are linked using link information to record the character information.

Data recorded in the U-TOC sector 2 are illustrated in FIG. 11.

In the U-TOC sector 2, recording dates of the individual programs recorded in the program area are managed in a form similar to that in the U-TOC sector 0 described hereinabove.

In particular, in slots indicated by the pointers P-TRDn (n ranges from 1 to 255 ) beginning with the slot (12th row, 2nd column), recording dates and so forth of the individual tracks are recorded.

FIG. 12 illustrates data recorded in the U-TOC sector 4.

In the U-TOC sector 4, titles of the individual tracks recorded in the program area and the title of the entire disc are recorded similarly as in the U-TOC sector 1. However, this sector 4 is set as a recording area for character information in which "kanji" characters, European characters or the like are used as a font.

The form of management is similar to that of the U-TOC sector 1 described hereinabove.

Further, in the U-TOC sector 4, "char code" is recorded in the slot (10th row, 4th column) in order to indicate a character type used for recording.

While the U-TOC sector 0, sector 1, sector 2 and sector 4 are defined in such a manner as described above, further sectors 5 to 31 may be utilized individually defining predetermined formats.

In the present embodiment, it is assumed that, as an example, character data can be recorded in the sector 5, and image data can be recorded in the sector 6.

For example, in the sector 5, text data can be recorded arbitrarily beginning with a byte position (for example, beginning with (4th row, 1st column) following the sector address).

The text data may be character information corresponding to the entire disc or may be character information corresponding to an arbitrary track.

Similarly, in the sector 6, image data or the like obtained by fetching photograph data by means of a CCD camera can be recorded as information corresponding to the disc or an arbitrary track.

In particular, a user who performs uploading using the audio server system of the present embodiment records character information or image information incidental to a musical program or the like to be uploaded in the U-TOC sector 5 or 6. Consequently, upon uploading of a certain track, the audio server system fetches also character information and/or image information recorded in the U-TOC sectors 5 and/or 6 and stores the same into the server 12. In other words, the audio server system effects filing corresponding to ATRAC data as seen from FIG. 2.

On the other hand, for a user who performs downloading, the audio server system can record, when ATRAC data of a certain content are to be recorded downwardly onto the disc D, incidental character information and/or image information onto the U-TOC sectors 5 and/or 6 of the disc D. In other words, the audio server system can download, in addition to a musical program or the like, also characters or an image provided by the provider of the musical program or the like onto the disc D owned by the user onto which downloading is to be performed.

It is to be noted that, while it is described that the sectors 5 and 6 are used, naturally some other sector or sectors may be used to store characters or an image.

5. Transmission System of Data for Upload/download

In the following, a data transmission system for uploading or downloading of the audio server system 1 is described. For the description, a detailed construction of the recording and playback section 20 shown in FIG. 3 is shown in FIG. 13.

Figure 13:
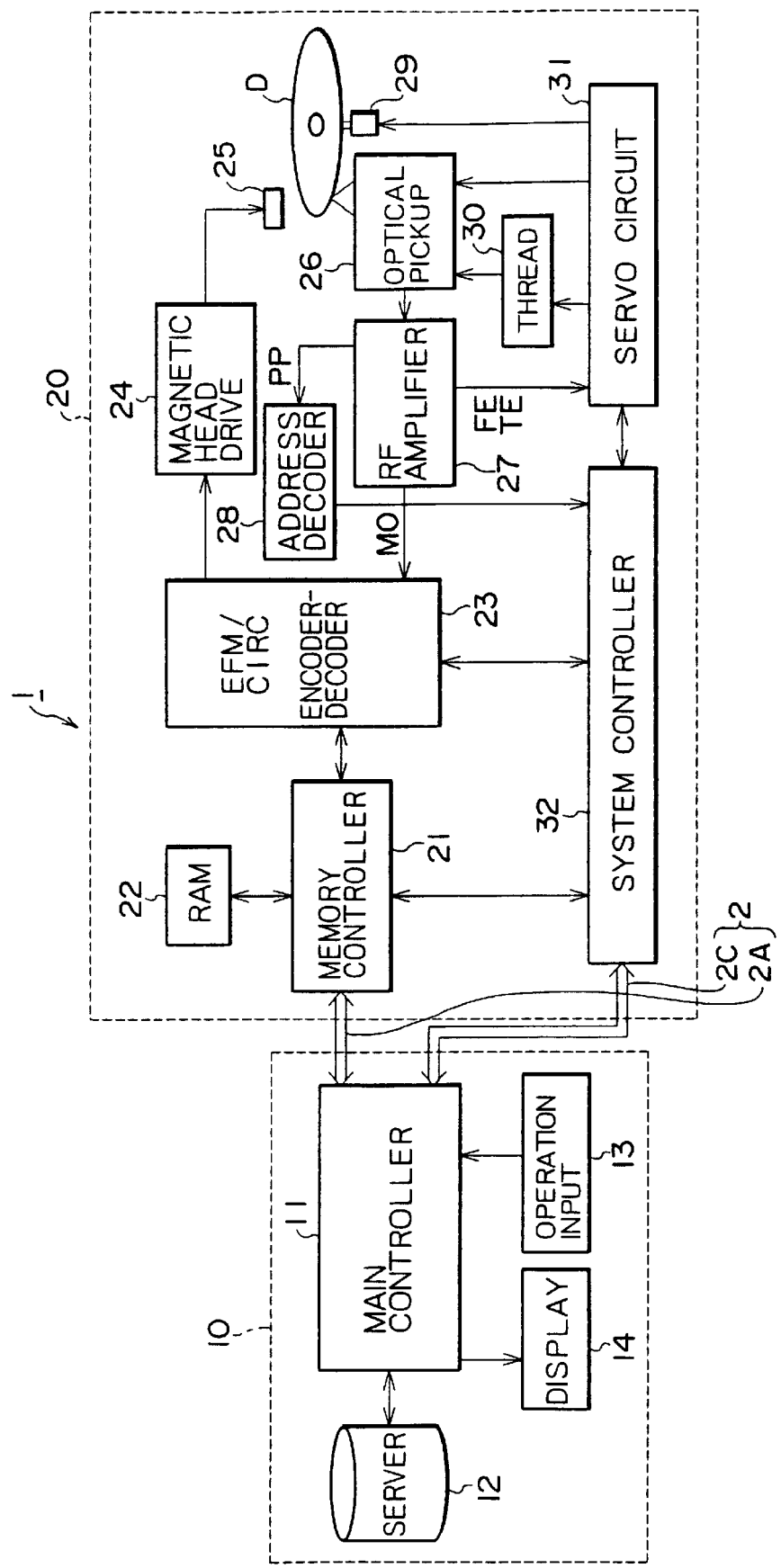
FIG. 13 is a block diagram of a server unit and a recording and playback section of the audio server system of FIG. 1.

Referring to FIG. 13, the recording and playback section 20 shown includes a memory controller 21 for receiving data from the server unit 10 and controlling a random access memory (RAM) 22, an encoder-decoder circuit 23 for decoding and encoding data, a magnetic head drive circuit 24 for driving a magnetic head 25, an optical pickup 26 for irradiating a laser beam upon a disc D and detecting reflected light, a radio frequency (RF) amplifier 27 for reproducing a focus error signal (FE), a tracking error signal (TE) and a magneto-optical playback signal (MO) from reflected light detected by the optical pickup 26, an address decoder 28 for playing back a signal corresponding to groove wobbles formed in a guide groove of the optical disc based on a push-pull signal (PP) from the RF amplifier 27 to decode an absolute address, a spindle motor 29 for driving the disc D to rotate, and a thread mechanism 30 for driving the optical pickup 26 to move in a radial direction of the disc D.

The recording and playback section 20 includes a servo circuit 31 for controlling focusing servoing, tracking servoing, thread servoing, spindle servoing and so forth based on the focusing error signal (FE) and the tracking error signal (TE) from the RF amplifier 27, and a system controller 32 for controlling the memory controller 21, the encoder-decoder circuit 23, the servo circuit 31 and so forth.

The optical pickup 26 irradiates a laser beam from a laser diode upon the disc D through an objective lens. Further, the optical pickup 26 detects reflected light from the disc D by means of a photodetector and supplies detection current to the RF amplifier 27.

The RF amplifier 27 produces a focusing error signal (FE), a tracking error signal (TE), a magneto-optical playback signal (MO) and a push-pull signal (PP) based on the detection current from the optical pickup 26.

The RF amplifier 27 supplies the thus produced focusing error signal (FE) and tracking error signal (TE) to the serve circuit 31, supplies the push-pull signal (PP) to the address decoder 28 and supplies the magneto-optical reproduction signal (MO) to the encoder-decoder circuit 23.

The servo circuit 31 drives the objective lens through a biaxial mechanism of the optical pickup 26 based on the focusing error signal (FE) and the tracking error signal (TE) supplied thereto to effect tracking and focusing servo controls of a laser beam to be irradiated upon the magneto-optical disc.

Further, the servo circuit 31 effects thread servo control based on the tracking error signal (TE) to drive the thread mechanism 30 to move the optical pickup 26 in a radial direction of the disc D.

Furthermore, the servo circuit 31 effects spindle servo control for driving the spindle motor 29 based on a spindle error signal from a rotation detection circuit for the disc D not shown so that the disc D may be rotated at a constant linear velocity (CLV).

The address decoder 28 reproduces address information from a wobble signal (push-pull signal PP) provided by a wobble groove formed in a guide groove of the optical disc D.

Upon playback of the disc D (upon uploading), the encoder-decoder circuit 23 binary digitizes, as processing of the played back signal from the disc D, the magneto-optical reproduction signal (MO) supplied thereto from the RF amplifier 27, demodulates the binary digitized magneto-optical playback signal in accordance with the EFM (eight to fourteen modulation) system and then effects decoding processing of error correction in accordance with the CIRC (cross interleaved Reed Solomon coding) system.

On the other hand, upon recording onto the disc D (upon downloading), the encoder-decoder circuit 23 adds, as processing of a recording signal to the disc D, error correction codes to a recording signal supplied thereto from the memory controller 21, modulates the resulting recording signal in accordance with the EFM system and supplies the modulated recording signal to the magnetic head drive circuit 24.

The magnetic head drive circuit 24 drives the magnetic head 25 in response to the recording signal from the encoder-decoder circuit 23 to apply a modulation magnetic field to the disc D to record the signal onto the disc D.

Upon such recording operation, the optical pickup 26 outputs a laser beam of a high power level so that the magnetic field information of the magnetic head 25 may be maintained by the recording face of the disc D.

The memory controller 21 controls ATRAC data to be stored into the random access memory 22. The memory controller 21 stores ATRAC data supplied thereto from the server unit 10 temporarily into the random access memory 22 and then supplies them to the encoder-decoder circuit 23.

On the other hand, upon playback of the disc D, the memory controller 21 temporarily stores ATRAC data decoded by the encoder-decoder circuit 23 and, in response to a data request from the data from the server unit 10, reads out and transfers the ATRAC data to the server unit 10.

The system controller 32 controls the entire recording and playback section 20, and controls, for example, the memory controller 21, encoder-decoder circuit 23, servo circuit 31 and so forth.

The system controller 32 controls those circuits which communicate control data with the server unit 10. This will be hereinafter described in detail.

The recording and playback section 20 of the audio server system having such a construction as described above records, upon downloading, ATRAC data transmitted thereto from the server unit 10 onto a disc D, but supplies, upon uploading, ATRAC data reproduced from the disc D to the server unit 10.

The audio server system 1 includes the connection cable 2 which interconnects the server unit 10 and the recording and playback section 20 as described above. Referring to FIG. 13, the connection cable 2 includes an ATRAC line 2A which transmits ATRAC data between the server unit 10 and the recording and playback section 20 (memory controller 21), and a command line 2C which transmits command data, TOC data and so forth between the server unit 10 and the recording and playback section 20 (system controller 32).

Data transferring methods between the server unit 10 and the recording and playback section 20 upon downloading and uploading are described with reference to FIGS. 14 to 17.

Figure 14:
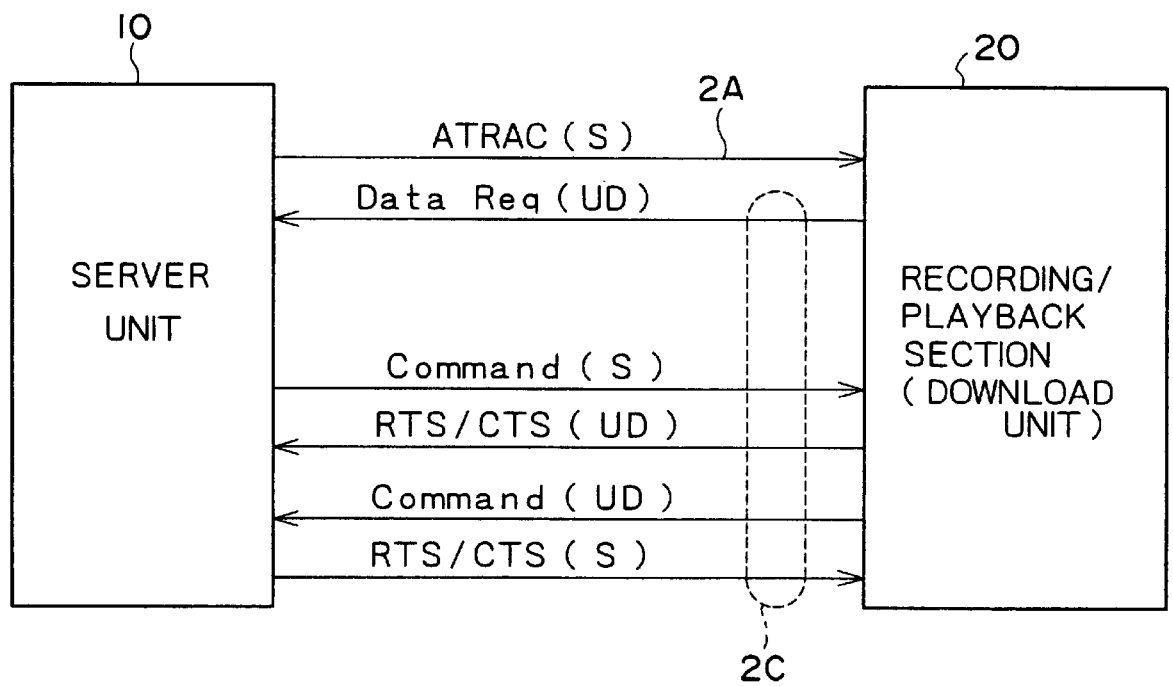
FIG. 14 is a diagrammatic view illustrating flows of signals upon downloading between the server unit and the recording and playback section shown in FIG. 13.
Figure 15:
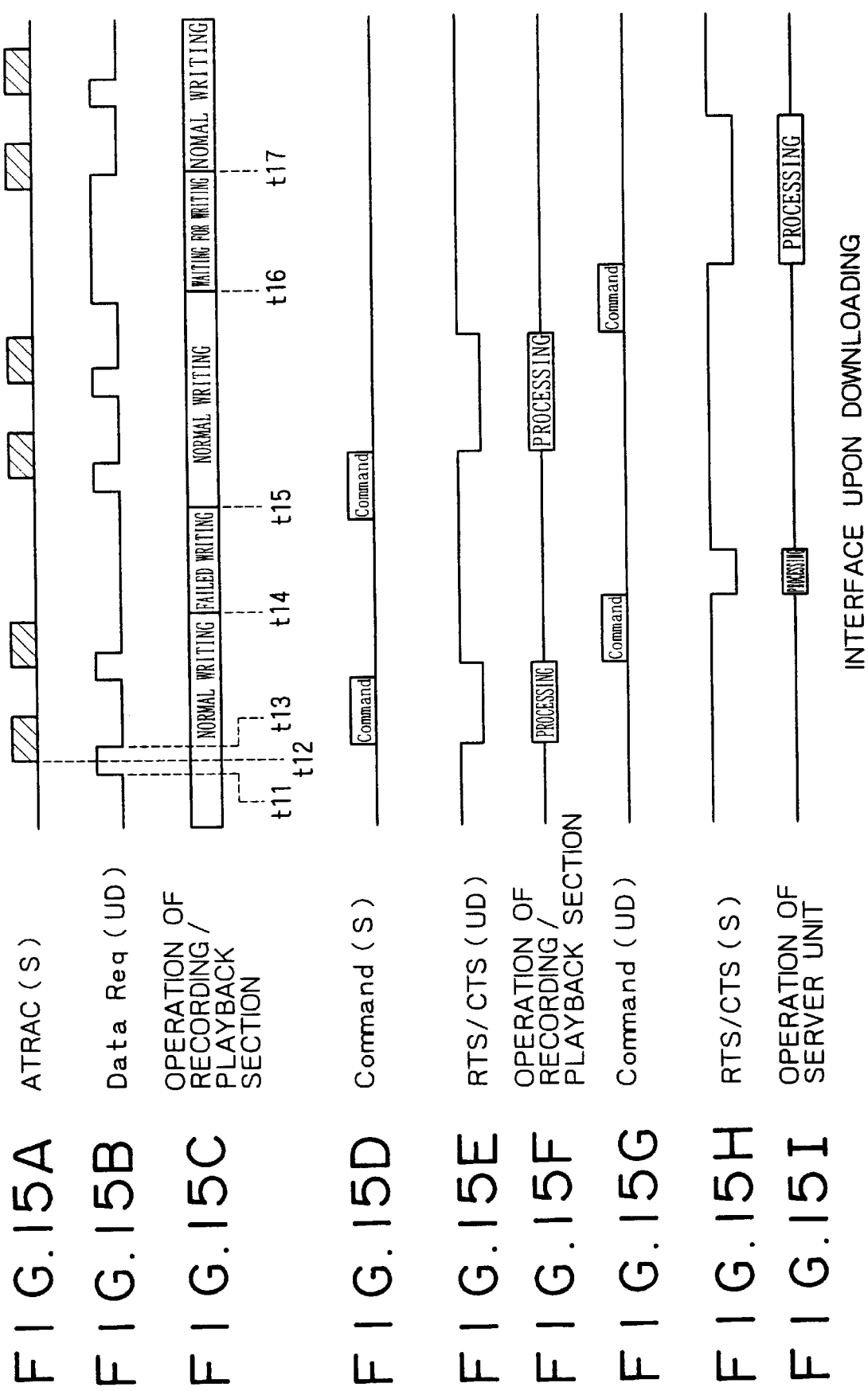
FIG. 15A is a timing chart of ATRAC data (ATRAC(S)) transmitted from the server unit side to the recording and play back section on the client side shown in FIG. 14.
FIG. 15B is a timing chart of data request data (DATA Req(UD)) transmitted from the recording and playback section on the client side to the server unit side shown in FIG. 14.
FIG. 15C is a timing chart illustrating a timing of recording by the recording and playback section shown in FIG. 14.
FIG. 15D is a timing chart of command data (Command (S)) transmitted from the server unit side to the recording and playback section on the client side shown in FIG. 14.
FIG. 15E is a timing chart of an RTS/CTS signal (RTS/CTS(UD)) for confirmation of a processing condition transmitted from the recording and playback section on the client side to the server unit side shown in FIG. 14.
FIG. 15F is a timing chart illustrating a timing of processing by the recording and playback section shown in FIG. 14.
FIG. 15G is a timing chart illustrating the command data (Command(UD)) transmitted from the recording and playback section on the client side to the server unit side shown in FIG. 14.
FIG. 15H is a timing chart of the RTS/CTS signal (RTS/CTS(S)) for confirmation of a processing condition transmitted from the server unit side to the recording and playback section on the client side shown in FIG. 14.
FIG. 15I is a timing chart illustrating a timing of processing on the server unit side shown in FIG. 14.

FIG. 14 illustrates flows of various signals upon downloading, and FIGS. 15A to 15I illustrate interface situations of various signals upon downloading. Meanwhile, FIG. 16 illustrates flows of various signals upon uploading, and FIGS. 17A to 17I illustrate interface situations of various signals upon uploading.

Figure 16:
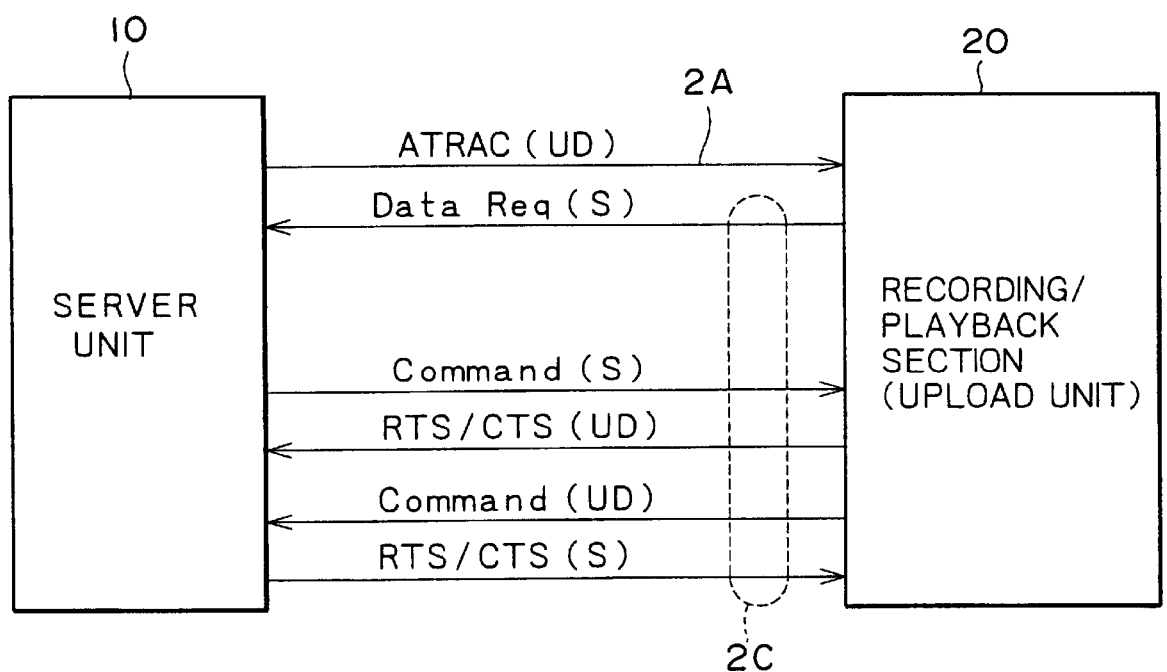
FIG. 16 is a diagrammatic view illustrating flows of signals upon uploading between the server unit and the recording and playback section shown in FIG. 13.

FIGS. 14 and 16 illustrate flows of signals through the ATRAC line 2A and the command line 2C. Upon downloading, the ATRAC line 2A is used so that ATRAC data are transmitted from the server unit 10 to the recording and playback section 20 which functions as a download unit.

On the other hand, upon uploading, the ATRAC line 2A is used so that ATRAC data are transmitted from the recording and playback section 20 which functions as an upload unit to the server unit 10.

Meanwhile, through the command line 2C, a request signal (Data Req), a command signal (Command) and an RTS/CTS signal are transmitted between the server unit 10 and the recording and playback section 20.

In particular, upon downloading, the recording and playback section 20 outputs a request signal (Data Req) for requesting for ATRAC data to the recording and playback section 20 as seen in FIG. 14. Further, the recording and playback section 20 and the server unit 10 communicate a command signal (Command) and an RTS/CTS signal therebetween.

On the other hand, upon uploading, the server unit 10 outputs a request signal (Data Req) for requesting for ATRAC data to the recording and playback section 20 as seen in FIG. 16. Further, the recording and playback section 20 and the server unit 10 communicate a command signal (Command) and an RTS/CTS signal therebetween.

It is to be noted that, for convenience of illustration and description, the reference symbol of each signal is accompanied by "S" where the signal is outputted from the server unit 10, but by "UD" where the signal is outputted from the recording and playback section 20.

First, transmission of ATRAC data upon downloading and upon uploading is described.

Upon downloading, ATRAC data (ATRAC(S)) corresponding to a content stored in the server 12 are transmitted from the main controller 11 of the server unit 10 to the memory controller 21 of the recording and playback section 20 over the ATRAC line 2A.

It is to be noted that the ATRAC data for transmission are transmitted for each unit of a predetermined amount in accordance with the capacity of the random access memory 22 of the recording and playback section 20.

Further, a request signal (Data Req(UD)) representative of a request for ATRAC data (ATRAC(S)) is transmitted from the system controller 32 of the recording and playback section 20 to the main controller 11 of the server unit 10 over the command line 2C.

In particular, since ATRAC data (ATRAC(S)) are transmitted in units of the predetermined amount, when ATRAC data (ATRAC(S)) which have been transmitted already and have been read into the random access memory 22 are all written onto the disc D, the recording and playback section 20 supplies a request signal (Data Req(UD)) to the server unit 10 to request for next data.

Particularly, a relationship between the ATRAC data (ATRAC(S)) and the request signal (Data Req(UD)) is illustrated in time charts of FIGS. 15A and 15B.

If the recording condition of the recording and playback section 20 is normal, then the recording and playback section 20 first supplies the request signal (Data Req(UD)) to the server unit 10 at time t11. When the request signal (Data Req(UD)) is received, the server unit 10 starts supply of ATRAC data (ATRAC(S)) for the predetermined capacity to the recording and playback section at time t12.

When ATRAC data (ATRAC(S)) are received, the recording and playback section 20 stops supply of the request signal (Data Req(UD)) at time t13.

If the recording condition of the recording and playback section 20 is not normal, then the request signal (Data Req(UD)) is not supplied from the recording and playback section 20 to the server unit 10 as seen from time t14 to time t15, and accordingly, no ATRAC data (ATRAC(S)) are supplied from the server unit 10 to the recording and playback section 20.

It is to be noted that, if no request signal (Data Req(UD)) is supplied from the recording and playback section 20, then the recording processing is interrupted.

Further, if no ATRAC data (ATRAC(S)) are received for a predetermined time from the server unit 10 even if the request signal (Data Req(UD))is supplied as seen from time t16 to time t17, the recording and playback section 20 enters a waiting condition for data writing, for example, enters a recording pause condition to wait for ATRAC data (ATRAC(S)).

Then, if ATRAC data (ATRAC(S)) are supplied, then the recording and playback section 20 starts a writing operation as seen from time t17.

It is to be noted that, if the waiting condition for writing continues for a fixed period of time, then the audio server system 1 determines that some trouble has occurred, and interrupts its processing.

Since the recording and playback section 20 supplies the request signal (Data Req(UD)) for ATRAC data to the server unit 10 and then the server unit 10 transmits ATRAC data (ATRAC(S)) to the recording and playback section 20 in response to the request signal (Data Req(UD)) in this manner, downloading of ATRAC data can be performed with certainty.

Then, upon uploading, ATRAC data (ATRAC(UD)) based on the tracks recorded on the disc D are transmitted from the memory controller 21 of the recording and playback section 20 to the main controller 11 of the server unit 10 over the ATRAC line 2A.

The ATRAC data (ATRAC(UD)) for transmission are transmitted for each unit of the predetermined amount in accordance with the buffering performance of the server unit or the wiring capacity of the server 12.

Further, the request signal (Data Req(s)) indicating a request for ATRAC data ((ATRAC(UD)) is transmitted from the main controller 11 of the server unit 10 to the system controller 32 of the recording and playback section 20 over the command line 2C.

In particular, the server unit 10 supplies the request signal (Data Req(S)) to the recording and playback section 20 in accordance with a writing operation condition into the server 12 to request for next data.

More particularly, a relationship between the ATRAC data (ATRAC(UD)) and the request signal (Data Req(S)) is illustrated in time charts of FIGS. 17A and 17B.

First, the server unit 10 supplies the request signal (Data Req(S)) to the recording and playback section 20 at time t21. When the request signal (Data Req(S)) is received, the recording and playback section 20 starts supply of ATRAC data (ATRAC(UD)) for the predetermined amount to the server unit 10 at time t22.

When the ATRAC data (ATRAC(UD)) are received, the server unit 10 stops its outputting of the request signal (Data Req(S)) at time t23.

If the recording condition of the server unit 10 is not normal, then no request signal (Data Req(S)) is outputted from the server unit 10 as seen from time t24 to t25, and accordingly, no ATRAC data (ATRAC(UD)) are supplied from the recording and playback section 20 to the server-unit 10, either.

Further, even if the server unit 10 supplies the request signal (Data Req(S)), if no ATRAC data (ATRAC(UD)) are received from the recording and playback section 20 for a predetermined period of time, then the server unit 10 enters a data writing waiting condition to wait for ATRAC data (ATRAC(UD)) as seen from time t26 to time t27.

Then, if ATRAC data (ATRAC(UD)) are supplied, then the server unit 10 starts its writing operation into the server 12 as seen from time t27.

It is to be noted that, if the writing waiting condition continues for a fixed period of time, then the server unit 10 determines that some trouble has occurred, and interrupts the processing.

Since the server unit 10 supplies the request signal (Data Req(S)) for ATRAC data to the recording and playback section 20 and then the server unit 10 transmits ATRAC data (ATRAC(UD)) to the recording and playback section 20 in this manner, uploading of ATRAC data can be performed with certainty.

Subsequently, various command signals (Command(S), Command(UD)) for operation control of such transmission and reception of ATRAC data as described above and uploading and downloading of TOC information which are communicated between the main controller 11 of the server unit 10 and the system controller 32 of the recording and playback section 20 are described.

As illustrated in FIGS. 14 and 16, the server unit 10 and the recording and playback section 20 communicate command signals (Command(S), Command(UD)) with each other, and set and confirm mutual occupation situations using RTS/CTS signals for a period of processing corresponding to a command.

In particular, both upon downloading and upon uploading, as seen from FIGS. 15D to 15I and 17D to 17I, if some command signal (Command(S)) is supplied from the server unit 10 to the recording and playback section 20, then the recording and playback section 20 performs processing corresponding to the command signal and sends back a signal (RTS/CTS(UD)).

On the other hand, if some command signal (Command (UD)) is supplied from the recording and playback section 20 to the server unit 10, then the server unit 10 performs processing corresponding to the command signal (Command(UD)) and returns a signal (RTS/CTS(S)).

Command signals communicated between the main controller 11 of the server unit 10 and the system controller 32 of the recording and playback section 20 over the connection cable 2 are listed in Table 1 given below. The commands are set with such values of 1 byte as given as an example in Table 1.

TABLE 1

| Command Name | Value (1 Byte) | Function | Argument |
| --- | --- | --- | --- |
| SETUP | 01h | Indication of recording pause | — |
| DOWN-LOAD REC | 02h | Indication of start of download Recording | — |
| STOP | 03h | End of process | — |
| TOC0 INFO | 04h | Transmission of information of TOC Sector 0 | Track No. (load order) Trackmode Track size |
| TNO | 05h | Designation track in loading order | Number in load order |
| UPLOAD TNO | 11h | Designation of upload track | Number of tracks Track number |
| UPLOAD PLAY | 12h | Instruction of start of upload playback | — |
| UPLOAD FIN | 13h | Notification of end of upload | — |
| TOC REQ | 14h | Request for transmission of TOC Information | Requested sector number n (n = TOC Sector(n)) |
| UD STATUS | 20h | Notification of state of upload/down-Load unit | Status 00h = STOP 01h = UPLOAD PLAY 02h = DOWNLOAD REC 03h = REC PAUSE FDh = ERROR |
| Title | 83h | Transmission of title Information | Number of characters Characters |

The setup command (SETUP) is a command for the server unit 10 to put the recording and playback section 20 into a recording waiting condition, that is, a condition for a recording pause. If the setup command (SETUP) is supplied, then the recording and playback section 20 enters a recording pause condition. The setup command (SETUP) particularly is, for example, "01h" of 1 byte.

The download recording command (DOWNLOAD REC) is a command to instruct the recording and playback section 20 to start recording of ATRAC data (ATRAC(S)) onto the disc D.

If the download recording command (DOWNLOAD REC) is supplied, then the recording and playback section 20 starts recording of ATRAC data (ATRAC(S)) onto the disc D. The download command (DOWNLOAD REC) is, for example, "02h".

The stop command (STOP) is a command indicating stopping of processing of the recording and playback section 20 based on a command from the server unit 10 or stopping of processing of the server unit 10 based on a command from the recording and playback section 20.

For example, if the stop command (STOP) is supplied from the server unit 10 to the recording and playback section 20, then the recording and playback section 20 stops recording processing or the like based on the download recording command (DOWNLOAD REC). The stop command (STOP) is, for example, "03h".

The TOC0 information command (TOC0 INFO) is a command for the server unit 10 to transmit information of the U-TOC sector 0 to the recording and playback section 20 or for the recording and playback section 20 to transmit such information to the server unit 10.

Upon downloading, if the server unit 10 supplies the TOC0 information command (TOC0 INFO) and succeeding information of a track number (a number as an order in downloading), a track size and a track mode as arguments to the recording and playback section 20, then the recording and playback section 20 determines a start address and an end address of recorded ATRAC data from the track size and records the TOC data into the U-TOC sector 0 of the disc D.

On the other hand, upon uploading, if the recording and playback section 20 supplies the TOC0 information command (TOC0 INFO) and succeeding information of a track number (a number as an order in uploading), a track size and a track mode as arguments to the server unit 10, then the server unit 10 determines a start address and an end address of recorded ATRAC data from the track size and records the TOC data into the U-TOC sector 0 of the disc D.

It is to be noted that, for example, upon downloading, information of the U-TOC sector 0 should originally be produced based on a recording operation executed by the recording and playback section 20 side, and recorded onto the disc D.

However, when, for example, ATRAC data of a plurality of contents are supplied from the server unit 10, since they are supplied as a single data stream to the recording and playback section 20, the recording and playback section 20 cannot produce track information of the TOC sector 0 accurately.

In other words, there is a problem that, since data transmitted are compressed data, a break of a tune cannot be determined.

Accordingly, in the present embodiment, a data size representative of the stream length of data corresponding to each content and a track mode are supplied as the TOC0 information command (TOC0 INFO) from the server unit 10. Then, the recording and playback section 20 produces information of the U-TOC sector 0 to be recorded onto the disc D based on the information of the TOC0 information command (TOC0 INFO).

Also upon uploading, information of the U-TOC sector 0 is transmitted from the recording and playback section 20 to the server unit 10 from a similar situation.

The TOC0 information command (TOC0 INFO) is "04h".

The track number command (TNO) is a command which designates a track number of ATRAC data to be uploaded or downloaded. If the track number command (TNO) and a track number (a number as an order in loading) succeeding the same are supplied, then the recording and playback section 20 or server unit 10 performs processing corresponding to a command succeeding the track number such as, for example, a title command (Title) for a track (content) of the track number. The track number command (TNO) is "05h".

The upload track number command (UPLOAD TNO) is a command which designates, upon uploading, a track to be uploaded from among the tracks on the disc D to the recording and playback section 20 by the server unit 10. One or a plurality of tracks are designated as an object of uploading with the upload track number command (UPLOAD TNO) and values of the number of tracks and track numbers of the tracks succeeding the upload track number command (UPLOAD TNO).

The upload track number command (UPLOAD TNO) is, for example, "11h".

The upload playback command (UPLOAD PLAY) is a command for the server unit 10 to instruct, upon uploading, the recording and playback section 20 to start playback of ATRAC data from the disc D. If the upload playback command (UPLOAD PLAY) is supplied, then the recording and playback section 20 starts playback of ATRAC data (ATRAC(UD)) from the disc D. The upload playback command (UPLOAD PLAY) is, for example, "12h".

The upload end command (UPLOAD FIN) is a command for the server unit 10 to instruct the recording and playback section 20 to indicate completion of uploading. The upload end command (UPLOAD FIN) is, for example, "13h".

The TOC request command (TOC REQ) is a command for the server unit 10 to request, upon uploading, the recording and playback section 20 to transfer TOC information. The value succeeding the TOC request command (TOC REQ) is the number of a U-TOC sector and requests for transfer of information of the necessary U-TOC sector. The TOC request command (TOC REQ) is, for example, "14h".

The status command (UD STATUS) is a command for the recording and playback section 20 to inform the server unit 10 of an operation condition. The value succeeding the status command (UD STATUS) represents an operation condition of the recording and playback section 20. For example, the succeeding value "00h" represents a stopping condition; "01h" represents a playback condition upon uploading; "02h" represents a recording condition upon downloading; "03h" represents a recording pause condition; and "FDh" represents an error occurring condition. The value of the status command (UD STATUS) is, for example, "20h".

The title command (Title) is a command for transmitting title information to be recorded into the U-TOC sector 1 and sector 4 of the disc D. Next to the title command (Title), character train information and character data are supplied. If they are received from the server unit 10 upon downloading, then the recording and playback section 20 records title information corresponding to the tracks into the U-TOC sector 1 and sector 4 of the disc D. On the other hand, upon uploading, if they are supplied from the recording and playback section 20 to the server unit 10, then the server unit 10 fetches them as title information corresponding to the uploaded ATRAC data.

The value of the title command (Title) is, for example, "83h".

6. Uploading/downloading Processing

In the following, contents of processing of the audio server system 1 for uploading and downloading are described with reference to flow charts shown in FIGS. 18 to 20. The flow charts represent processing of the main controller 11 of the server unit 10.

The server unit 10 (main controller 11) displays, for example, within a period within which no uploading or downloading operation is performed, a list of the contents registered in the server 12 at the point of time by the display section 14 in step S101.

Where, for example, such contents as illustrated in FIG. 2 are registered, necessary information regarding the contents is extracted and displayed in such a list as shown in FIG. 21.

In particular, for each of the contents, the title, the length of the program, the registering person (person who has uploaded), the registration date (uploading date), the number of times of downloading operations experienced, an amount of money to be charged upon a download user upon downloading (that is, a sales price of the program or the like, and this is decided, for example, based on a desired amount of money to be received by the upload user) and so forth are displayed and presented to the user who tries to download.

Further, though not shown, an operation menu is displayed together with the list display.

It is to be noted that the list displaying in step S101 may be performed when downloading is selected with the operation menu (immediately prior to step S104).

In the operation menu, such operations for downloading, uploading, audition prior to downloading and so forth are prepared. Here, only a downloading operation and an uploading operation are described.

If the user operates the operation inputting section 13 to select downloading while observing the display section 14, the control advances from step S102 to step S104, in which processing for downloading is started.

On the other hand, if the user selects uploading from the operation menu, then the control advances from step S103 to step S112, in which processing for uploading is started.

First, processing for downloading is described.

In step S104, the server unit 10 requests the user to select a content to be downloaded. The server unit 10 requests the user to select a desired one or more contents, for example, on such a display of a list as shown in FIG. 21.

If selection is completed, then the server unit 10 fetches selected operation information, and the control advances from step S105 to S106, in which the server unit 10 requests the user to load a disc D into the recording and playback section 20.

If the user loads the disc D carried thereby into the recording and playback section 20, then the control advances from step S107 to step S108.

It is to be noted that, depending upon the case, it may possibly occur that, from the time amount (recordable remaining time) of the free area (non-recorded area) of the disc D carried in by the user and the total time length of the selected content or contents, the free area may not be sufficiently long to allow execution of downloading. Therefore, actually in step S107, comparison between the amount of ATRAC data to be downloaded and the recordable remaining time of the disc D are compared with each other, and if the recordable remaining time is not sufficient, then it is necessary to request the user for replacement of the disc D or the like or to end the processing as the download processing is impossible.

The recordable remaining time of the disc D loaded can be confirmed by the server unit 10 using such a technique that the server unit 10 requests for transfer of information of the U-TOC sector 0, which has been read in upon loading of the disc D by the system controller 32 of the recording and playback section 20, using the TOC request command (TOC REQ) described hereinabove.

After the disc D is loaded, the server unit 10 calculates, in step S108, a total amount of money for the one or more contents selected as an object of downloading and requests the user to pay the charge.

If the user pays the charge into the receipt/payment block 50 in response to the request, then the control advances from step S109 to step S110, in which actual downloading processing is started.

It is to be noted that, upon downloading of a content which is provided free of charge, the processing in steps S108 and S109 is not required naturally.

Figure 19:
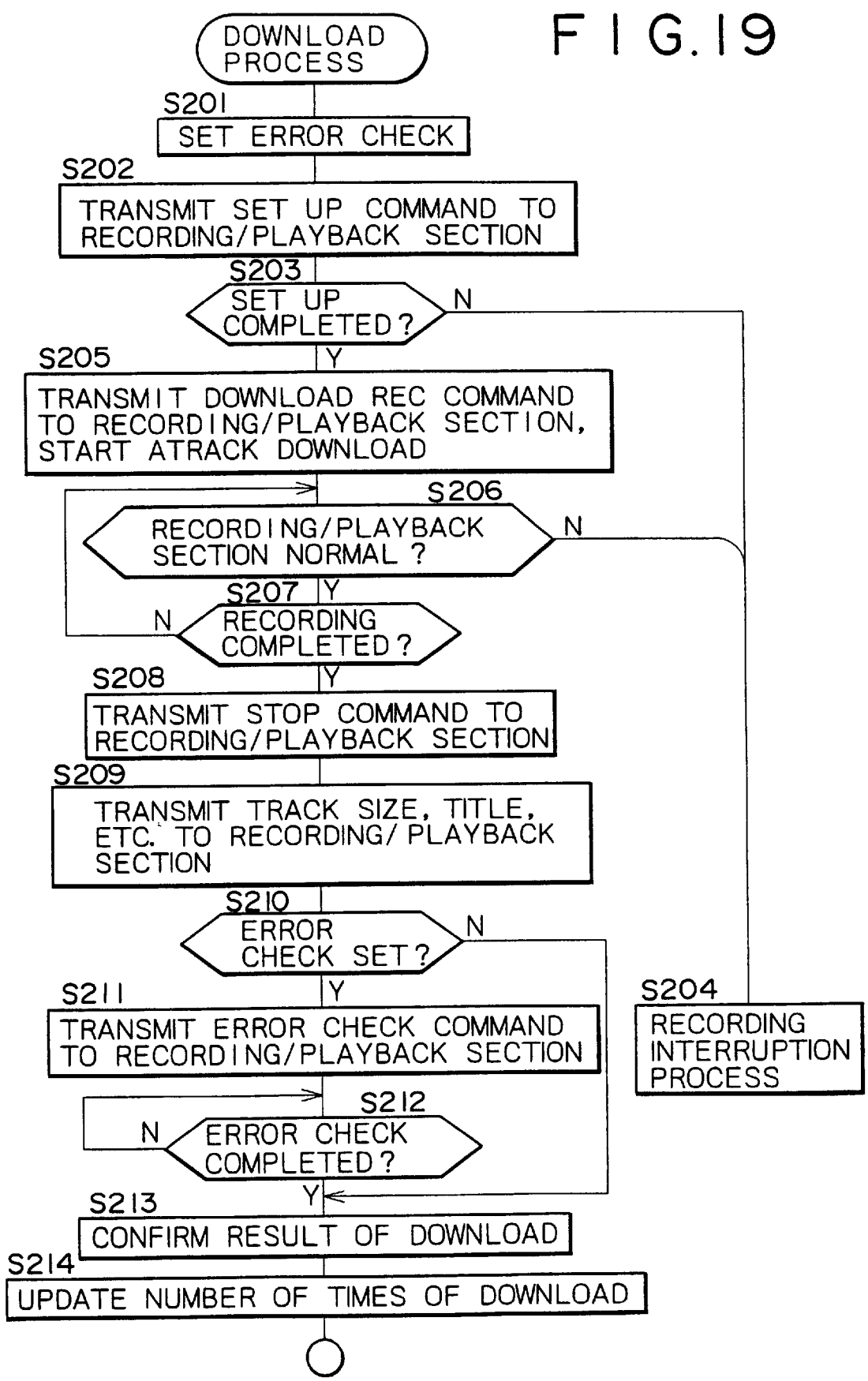
FIG. 19 is a flow chart illustrating processing of the sever unit shown in FIG. 13 upon downloading processing.

The downloading processing in step S110 is illustrated in FIG. 19.

After the downloading processing is started, the server unit 10 inquires, first in step S201, the user using the display section 14 whether or not error checking should be performed. If the user inputs using the operation inputting section 13 that error checking should or should not be performed, then the control advances to step S202. It is to be noted that the error checking will be hereinafter described.

In step S202, the server unit 10 supplies the setup command (SETUP) to the recording and playback section 20 over the command line 2C. When the setup command (SETUP) is received from the server unit 10, the recording and playback section 20 sets the operation condition to a recording pause condition to the disc D.

In step S203, the server unit 10 confirms whether or not setting of a recording pause has been executed as the operation condition of the recording and playback section 20, and if it confirms that such setting has been executed, then the control advances to step S205. On the other hand, if such setup to a recording pause condition is not confirmed within a predetermined period of time, then the control advances to step S204. It is to be noted that, while description is given also of a concrete example of operation which will be hereinafter described, the server unit 10 can confirm the operation condition of the recording and playback section 20 if it receives the status command (UD STATUS) from the recording and playback section 20.

In step S204, the server unit 10 determines that the recording and playback section 20 cannot record onto the disc D because of some trouble, and displays an error message or the like on the display section 14 and ends its processing.

When the control advances to step S205, the server unit 10 supplies the download recording command (DOWNLOAD REC) to the recording and playback section 20.

When the download recording command (DOWNLOAD REC) is received, the recording and playback section 20 supplies a request signal (Data Req(UD)) to the server unit 10. When the request signal (Data Req(UD)) is received, the server unit 10 supplies ATRAC data (ATRAC(S)) for each predetermined amount to the recording and playback section 20. Then, when the ATRAC data are supplied, the recording and playback section 20 records the data successively into the blank area of the disc D. In short, downloading of ATRAC data is started in step S205.

It is to be noted that, even if a plurality of contents have been designated by the user, the server unit 10 supplies ATRAC data (ATRAC(S)) as a single stream to the recording and playback section 20.

Further, the recording and playback section 20 stores information of the U-TOC of the disc in advance into an external memory or the like so that, when recording onto the disc D is not performed normally, the condition of the disc D may be returned to the condition of the disc prior to the downloading.

After recording of ATRAC data is started in step S205, the control advances to a loop of steps S206 and S207.

In step S206, the server unit 10 supervises the status command (UD STATUS) from the recording and playback section 20 to discriminate whether or not the status command (UD STATUS) exhibits an abnormal condition, that is, whether or not a status value other than a recording condition or a status value of an error is generated. If none of such status values is generated and the recording condition is normal, the server unit 10 detects whether or not transmission of ATRAC data to be downloaded and recording of them onto the disc D have completed in step S207.

In other words, in steps S206 and S207, the recording and playback section 20 confirms after each fixed interval of time whether or not recording is normal and whether or not the recording is completed.

If it is determined by the recording and playback section 20 that recording is not performed normally, then the control advances from step S206 to step S204, in which interruption processing of the recording processing is performed. In this instance, in order to return the disc D to its condition prior to the recording, processing of writing the U-TOC information which has been stored into the external memory or the like in advance back into the disc D is performed.

If it is determined that recording is performed by the recording and playback section 20 and the recording is completed, then the control advances from step S207 to step S208.

In step S208, the server unit 10 supplies the stop command (STOP) to the recording and playback section 20. When the stop command (STOP) is received, the recording and playback section 20 ends the recording processing of ATRAC data. After the stop command (STOP) is transmitted, the control advances to step S209.

In step S209, the server unit 10 supplies, together with the track number command (TNO), necessary TOC information of the TOC0 information command (TOC0 INFO) and track size information as an argument of the TOC0 information command (TOC0 INFO), the title command (Title) and the number of characters of the title, character data and so forth.

When such TOC information is received from the server unit 10, the recording and playback section 20 records required data onto the U-TOC sectors 0 to 4 of the disc D based on the TOC information supplied thereto.

It is to be noted that the start addresses and the end addresses of the individual tracks which are to be recorded into the U-TOC sector 0 are produced based on the information of the track sizes supplied succeeding the TOC0 information command (TOC0 INFO). In particular, since the ATRAC data are supplied as a single data stream, the data stream is divided with a data size for each track to produce TOC information.

Further, where also character data and/or image data are present as contents which make an object of loading, they are transmitted as information to be recorded, for example, into the U-TOC sector 5 and sector 6. The recording and playback section 20 records such character information and image information into the U-TOC sectors 5 and 6 or the like in such a form that they correspond to the ATRAC data recorded as an object of downloading.

After the necessary TOC information is transmitted in step S209, the control advances to step S210.

In step S210, the server unit 10 discriminates whether or not the user has set to perform error checking formerly in step S201. If the user has set so that error checking should be performed, then the control advances to step S211, but if the user has not set so that error checking should be performed, the control advances to step S213.

When error checking should be performed, the server unit 10 supplies an error check command to the recording and playback section 20 over the command line 2C in step S211. If the error check command is supplied, then the recording and playback section 20 reads out ATRAC data recorded therein and determines whether or not the recorded data include some error.

After error checking by the recording and playback section 20 is started, the server unit 10 waits in step S212 until the error checking is completed, and after the error checking is completed, the control advances to step S213.

In step S213, the server unit 10 displays a result of recording on the display section 14. For example, if it is determined as a result of the error checking that the recorded data include an error, then the server unit 10 displays an error message or the like on the display section 14. It is to be noted that it is preferable to record, if the result of the error checking reveals that the recorded data include some error, then the TOC information prior to the recording which has been stored formerly into the external memory back onto the disc D so that the disc D may be returned to its condition prior to the dubbing operation.

After a result of recording is displayed in step S213, results of the downloading regarding each content downloaded are updated in step S214. In particular, the value of the number of download times of each downloaded contents in such a file structure as shown in FIG. 2 is rewritten (incremented by one).

Incidentally, also the value of the number of unpaid times is incremented by one. After the processing in step S214 is completed, the control advances to step Sill of FIG. 18, in which the server unit 10 instructs the recording and playback section 20 to execute unloading of the disc D, thereby ending the sequence of operations of downloading processing.

Now, processing for uploading is described.

If the user selects uploading from within the operation menu, then the control advances from step S103 to step S112, in which processing for uploading is started.

In S112, the server unit 10 requests the user to input a user name, a password and so forth. The password is used, for example, for collation upon payment of a charge based on results of downloading of uploaded musical programs and so forth.

It is to be noted that setting of a password is not limited to inputting by a user and may possibly assume various forms.

For example, the server unit 10 may automatically set a password and outputs the password by printing of the printer apparatus 47 to deliver it to the upload user.

Another system may possibly be employed wherein a password automatically generated is written into a predetermined area of a disc D loaded for uploading. In this instance, for example, it is possible not to present the password even to the upload user itself but to request the user, for example, upon payment of a charge, to load the disc D itself to effect collation of the password.

Also such a system wherein a user records a password in a predetermined area of a disc D in advance may possibly be implemented.

Further, where an upload user wants to provide a musical program or the like with charge, an amount of money to be charged for each downloading may be inputted in step S112. It is to be noted that, in order to make it possible to upload a plurality of tracks and set different amounts of money for the different tracks, for example, an amount of money may be inputted for each track when an upload track is designated in step S116.

It is to be noted that the amount of money to be paid need not be inputted by a user, but may be set automatically (for example, to a uniform charge) by the server unit 10.

The upload user will operate the operation inputting section 13 in response to the request in step S112 to input its user name, password and so forth. If the inputting is completed, then the control advances from step S113 to step S114, in which the server unit 10 requests the user to load a disc D into the recording and playback section 20.

If the user loads the disc D carried in thereby, that is, the disc D in which a musical program or the like to be uploaded is recorded, into the recording and playback section 20, then the control advances from step S115 to step S116.

In step S116, the server unit 10 requests the user to designate a track to be uploaded from among tracks recorded on the thus loaded disc D.

If the user performs a track designation operation and one or more tracks are designated, then the server unit 10 fetches the designation operation information, and the control advances from step S117 to step S118.

Upon track designation in step S116, it is preferable to cause the display section 14 to display track numbers and/or track names of the tracks recorded on the disc D so that a designation operation may be performed on the display. Information of the track number, track names and so forth of the loaded disc D can be acquired by the server unit 10 using such a technique that the server unit 10 requests for transfer of information of the U-TOC sector 0, sector 1 and so forth, which have been read in by the system controller 32 of the server unit 10 upon loading of the disc D, using the TOC request command (TOC REQ) described above.

It possibly occurs that a track to be uploaded cannot be designated because the user has loaded a wrong disc D. Therefore, it is required that a user can operate to effect replacement or the like of a disc D.

If the preparation procedure described above is completed and the control advances from step S117 to step S118, then uploading processing is started. The processing in step S118 is illustrated in FIG. 20.

Figure 20:
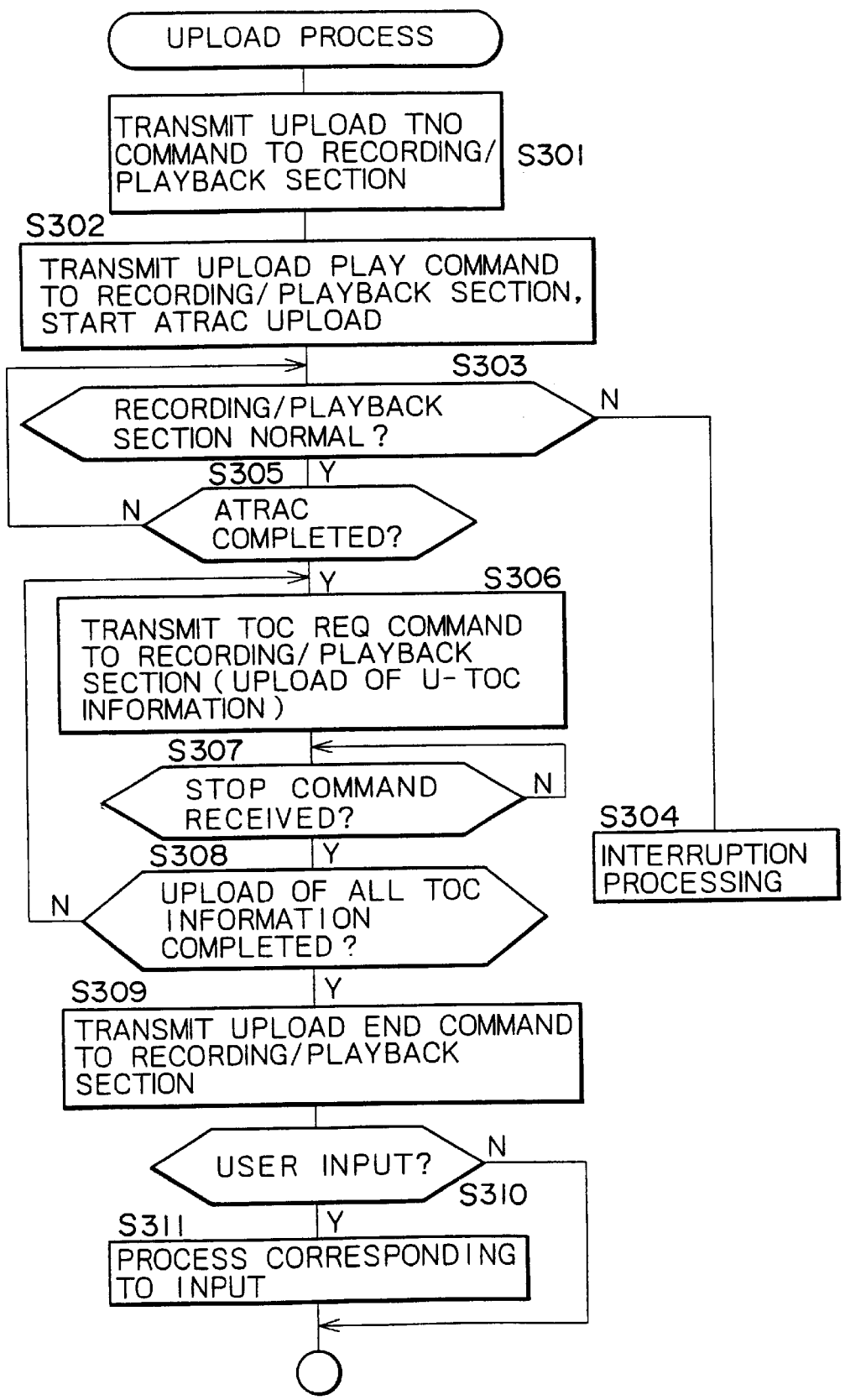
FIG. 20 is a flow chart illustrating processing of the sever unit shown in FIG. 13 upon uploading processing.

Referring now to FIG. 20, after uploading processing is started, the server unit 10 first transmits the upload track number command (UPLOAD TNO) to the recording and playback section 20 in step S301. In particular, the server unit 10 informs the recording and playback section 20 with an upload track number command (UPLOAD TNO) and values of a number of tracks and a track number or numbers succeeding the upload track number command (UPLOAD TNO) that one or more tracks have been set as an object of uploading.

Then in step S302, the server unit 10 transmits the upload playback command (UPLOAD PLAY) to the recording and playback section 20.

When the upload playback command (UPLOAD PLAY) is received, the recording and playback section 20 starts a playback operation of the one or more tracks designated by the upload track number command (UPLOAD TNO).

Then, from this point of time, the server unit 10 supplies a request signal (Data Req(S)) to the recording and playback section 20 and successively records ATRAC data (ATRAC (UD)) successively transmitted thereto from the recording and playback section 20 in response to the request signal (Data Req(S)) into the server 12. In short, uploading of ATRAC data is started in step S302.

After uploading of ATRAC data is started in step S302, the control advances to a loop of steps S303 and S530.

In step S303, the server unit 10 supervises the status command (UP STATUS) from the recording and playback section 20 to detect whether or not an abnormal condition has occurred, that is, whether or not a status value as an error is generated. If no abnormal condition has occurred and the playback condition is normal, then the server unit 10 supervises the status command (UD STATUS) from the recording and playback section 20 in step S305 to detect whether or not a stopping condition is reached, that is, whether or not the recording and playback section 20 has completed playback and transmission of ATRAC data of the designated track or tracks.

In short, in steps S303 and S305, it is confirmed after each fixed interval of time whether or not playback is normal and the playback has been completed.

If it is determined that playback by the recording and playback section 20 is not performed normally, then the control advances from step S303 to step S304, in which interruption processing of the uploading processing is performed.

If playback is performed normally by the recording and playback section 20 and recording into the server 12 is completed, then the control advances from step S305 to step S306.

In step S306, the server unit 10 transmits the TOC request command (TOC REQ) to the recording and playback section 20 to request for transmission of the TOC information.

For example, the server unit 10 transmits an argument "00h" together with the TOC request command (TOC REQ) to request for information of the U-TOC sector 0 regarding the uploaded track or tracks.

In response to the request, the recording and playback section 20 transmits the TOC0 information command (TOC0 INFO) and track size information and so forth as an argument of the TOC0 information command (TOC0 INFO). Then, the recording and playback section 20 informs the server unit 10 of completion of the transmission using the stop command (STOP).

The server unit 10 fetches the information of the U-TOC sector 0 transmitted thereto in this manner and makes them correspond to the uploaded tracks. In particular, since one or more ATRAC data are uploaded as a single data stream, the server unit 10 divides the data stream based in the information of the fetched U-TOC sector 0 with the data size for each track so that the uploaded tracks may be managed correctly as individual contents.

Then, if the stop command (STOP) is received, then the control advances from step S307 to step S308. Then, if it is determined in step S308 that there remains TOC information whose transmission is to be requested, then the control returns to step S306.

Then, the server unit 10 transmits, for example, an argument "01" together with the TOC request command (TOC REQ) to request for the information of the U-TOC sector 1 regarding one of the uploaded tracks.

In response to the request, the recording and playback section 20 transmits the title command (Title) and a character number and characters as arguments of the title command (Title) back to the server unit 10. Then, the recording and playback section 20 transmits completion of the transmission using the stop command (STOP).

The server unit 10 fetches the information of the U-TOC sector 1 transmitted thereto in this manner and makes it correspond to one of the tracks. Then, if the stop command (STOP) is received, then the control advances from step S307 to step S308. Then, if it is determined in step S308 that there still remains TOC information for which transmission is requested, then the control returns to step S306.

Such processing as described above is repeated to successively fetch information regarding the uploaded tracks such as, for example, the U-TOC sector 0, sector 1, sector 4, sector 5, sector 6 and so forth. Further, incidentally to the ATRAC data as tracks uploaded in this manner, title information, character information, image information and so forth are successively uploaded.

Consequently, a file form in which various information is listed corresponding to each content as seen in FIG. 2 is produced.

After all necessary information is uploaded, the control advances to step S309, in which the server unit 10 transmits the upload end command (UPLOAD FIN) to inform the recording and playback section 20 of completion of the uploading.

The step S310 provides countermeasure processing when the user further registers relating information or the like using the operation inputting section 13 or the like. For example, the step S310 provides a countermeasure when character information is not recorded in the disc D in advance while the user wants to register character information in a corresponding relationship to ATRAC data. In particular, if the user wants to input characters of a message or the like when the user tries to effect uploading, then an input requesting operation is executed in step S310, and in this instance, the server unit 10 advances its control to step S311. In step S311, the server unit 10 registers characters inputted from the operation inputting section 13 in a corresponding relationship to the uploaded ATRAC data.

Further, URL information may be inputted at this point of time.

It is to be noted that the audio server system 1 may additionally include an image scanner, a CCD camera or the like so that an upload user may input image data at the place.

Figure 18:
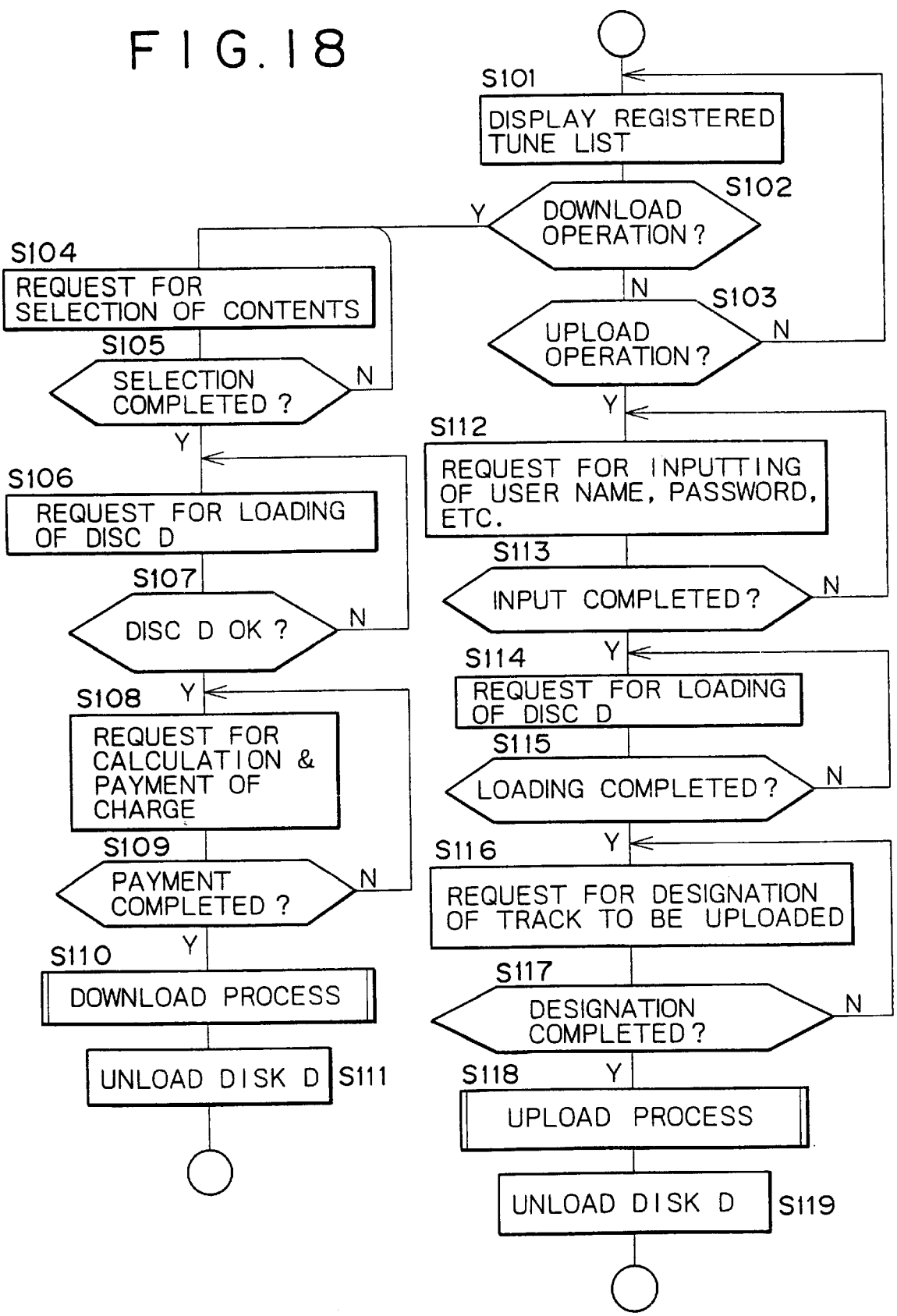
FIG. 18 is a flow chart illustrating processing of the server unit shown in FIG. 13.

After the processing in steps S310 and S311 is completed, the control advances to step S119 of FIG. 18, in which the server unit 10 causes the recording and playback section 20 to execute unloading of the disc D, thereby ending the sequence of operations of uploading processing.

By such processing as described above, the audio server system 1 can perform uploading/downloading processing.

It is to be noted that, while it is described that, in the processing described above, upon downloading, necessary TOC information is supplied to the recording and playback section 20 after all ATRAC data are recorded, TOC information may alternatively be supplied before the server unit 10 supplies ATRAC data to the recording and playback section 20.

In particular, the processing in step S209 is performed after the setup is completed but before the start command (START) is supplied, that is, between the processing in step S203 and the processing in step S205. It is to be noted that, since the recording and playback section 20 records TOC information after ATRAC data are recorded onto the disc D, the TOC information supplied formerly must be saved in the external memory or the like.

Further, in the audio server system 1, while the server unit 10 supplies ATRAC data to the recording and playback section 20, it may supply TOC information simultaneously.

In particular, since the data line at which ATRAC data and commands are supplied is different between the ATRAC line 2A and the command line 2C, the processing in steps S206 and S207 and the processing in step S209 can be performed in a parallel manner. This can reduce the data transmission time for a sequence of steps of downloading processing. It is to be noted that, also in this instance, it is necessary for the recording and playback section 20 to save the TOC information into the external memory or the like and record, after all ATRAC data are recorded, the TOC information onto the disc D.

Further, while it is described that, in the processing in steps S201 to S213, ATRAC data corresponding to a plurality of contents are handled as a single data stream and information necessary for production of TOC information is supplied separately from the server unit 10 to the recording and playback section 20, there is no limitation to the specific processing. For example, if a plurality of contents are designated by a user, then also such processing as to record ATRAC data corresponding to one of the contents onto the disc D, produce and record TOC information of the thus recorded ATRAC data and then record ATRAC data corresponding to a next one of the contents is possible.

In particular, such processing can be performed by forming the processing in steps S205 to S209 in a loop in which the processing is repeated for each one content.

While various processing methods for transfer of ATRAC data and transfer of TOC information are available in regards to the order of the transfers or as parallel processing, this also applies to uploading. In particular, it is possible to effect uploading of TOC information prior to uploading of ATRAC data, to effect uploading of TOC information and ATRAC data in a parallel manner or to effect uploading of ATRAC data and TOC information for each one track.

7. Example of Downloading Operation

An example of down loading operation executed by the downloading processing described above is described below with reference to FIGS. 22 to 27.

Here, an example of operation particularly when musical contents for 2 programs are downloaded onto a disc D is described with reference to timing charts and so forth.

It is assumed that, in the server 12, a large number of contents are recorded such as, as seen in FIG. 22(*a*), a content #1 whose title is "ByeBye", track mode (trmd) is "a6", and track size is "0002.00.00", a content #2 whose title is "Hello", track mode (trmd) is "a6" and track size is "0010.2f.0a", and a content #3 whose title is "Morning", track mode (trmd) is "86" and track size is "0020.1e.00".

Meanwhile, it is assumed that, on the disc D which has been carried in by the user and onto which downloading is to be performed, as seen in FIG. 22(*b*), two musical programs of a first track Tr1 whose title is "Emotion", track mode (trmd) is "e6" and track size is "0011.05.02" and a second track Tr2 whose title is "Dream", track mode (trmd) is "e6" and track size is "0022.1f.0a" are recorded.

Here, if the user loads the disc D into the recording and playback section 20, selects the contents #2 and #3 in the server 12 and performs an operation for downloading, then the content #2 (ATRAC data and so forth whose title is "Hello") and the content #3 (ATRAC data and so forth whose title is "Morning") stored in the server 12 are recorded onto the disc D. In this instance, such processing as illustrated in FIGS. 23A to 23E, 24A to 24D, 25A to 25D and 26A to 26D is performed.

FIGS. 23A to 23E are time charts of command data communicated between the server unit 10 and the recording and playback section 20 when the ATRAC data are downloaded. It is to be noted that, in FIGS. 23A to 23E, the RTS/CTS signal is omitted.

First, as seen in FIG. 23C, the server unit 10 supplies the setup command (SETUP) "01h" to the recording and playback section 20 at time t31.

When the setup command (SETUP) is received, the recording and playback section 20 enters a recording pause condition at time T32 as seen in FIG. 23E and transmits a status command (UD STATUS) and the value "03h" representative of a recording pause to the server unit 10 to inform the server unit 10 that a setup condition is entered.

After the setup of the recording and playback section 20 is confirmed, the server unit 10 supplies the download recording command (DOWNLOAD REC) "02h" to the recording and playback section 20 in step t33 as seen in FIG. 23C.

The supply of the download recording command (DOWNLOAD REC) corresponds to the processing in step S205 described hereinabove.

When the download recording command (DOWNLOAD REC) is received, the recording and playback section 20 starts a recording operation and transmits the value "02h" representative of a recording condition, together with the status command (UD STATUS) "20h" to the server unit 10 as seen in FIG. 23D to inform the server side of the recording condition.

The server unit 10 starts supply of ATRAC data for the predetermined amount, that is, ATRAC data (ATRAC(S)) of the content #2 and the content #3 stored in the server 12, to the recording and playback section 20 based on the request signal (Data Req(UD)) illustrated in FIG. 23B which is transmitted thereto from the recording and playback section 20 later than time t34.

Then, since the server unit 10 supplies ATRAC data (ATRAC(S)) for each predetermined amount, it successively supplies data to the recording and playback section 20 based on the request signal (Data Req(UD)) successively generated as seen in FIG. 23B.

Meanwhile, the server unit 10 supervises to detect whether or not the status command (UD STATUS) is transmitted thereto from the recording and playback section 20 and checks whether or not the recording condition of the recording and playback section 20 is normal. This corresponds to the processing in step S206 described hereinabove.

It is to be noted that, although the recording and playback section 20 transmits a condition thereof using the status command (UD STATUS) and an argument of the status command (UD STATUS) each time its operation condition changes, for example, even if the operation condition does not vary, the recording and playback section 20 may periodically transmit a condition thereof using the status command (UD STATUS) "20h" and an argument of it.

If the server unit 10 determines that it has supplied all ATRAC data to the recording and playback section 20, then it supplies the stop command (STOP) "03h" to the recording and playback section 20 at time t35 as seen from FIG. 23C.

The processing of supplying the stop command (STOP) corresponds to the processing in step S208 described hereinabove.

If the stop command (STOP) is received and all ATRAC data supplied are recorded onto the disc D, then the recording and playback section 20 ends its recording processing at time t36 and informs the server unit 10 that the stopping condition is entered using the status command (UD STATUS) "20h" and the value "00h" representative of the stopping condition as seen in FIG. 23D.

FIGS. 24A to 24D are time charts illustrating communication of the TOC0 information command (TOC0 INFO) supplied from the server unit 10 to the recording and playback section 20 in step S209 described hereinabove.

It is to be noted that FIGS. 24A to 24C show time charts of transmission data between and processing of the server unit 10 and the recording and playback section 20, and FIG. 24D illustrates recording conditions of the U-TOC sector 0 of the disc D at different times.

First, at time t41 before which no TOC0 information command (TOC0 INFO) is supplied, in the U-TOC sector 0 of the disc D, the start addresses, end addresses and track modes of the first and second tracks Tr1 and Tr2 (tracks whose titles are "Emotion" and "Dream") recorded formerly are recorded.

As seen from FIG. 24A, the server unit 10 supplies, at time t42, the track mode and the track size of the first content (in this instance, the content #2) from between the two contents whose downloading has been performed. In particular, the server unit 10 supplies, together with the TOC0 information command (TOC0 INFO) "04", the content number "01h" as a loading order number of the ATRAC data of the content #2 ("01h" indicates the first download track of the two download tracks), the track mode "a6h" of the content #2 illustrated in FIG. 22 and the track size "0010h, 2fh, 0ah" of the content #2.

When the track mode and the track size of the first content (#2) of the plurality of contents whose downloading has been performed are received, the recording and playback section 20 performs processing to produce information of the U-TOC sector 0 based on the information supplied thereto and record it onto the disc D.

It is to be noted that, while the processing is executed, the recording and playback section 20 returns the signal (RTS/CTS(UD)) as seen in FIG. 24B.

Accordingly, at time t43, the track mode and the start address and end address corresponding to the first content (#2) which has been downloaded are recorded into the U-TOC sector 0 of the disc D.

Here, the first content (#2) of the contents which have been downloaded is managed as a third track Tr3 in the U-TOC sector 0 since the two tracks were recorded on the disc D already prior to the downloading.

After time t43, as seen from FIG. 24A, the server unit 10 supplies the track mode and the track size of the second content (in this instance, the content #3) of the contents which have been downloaded. In particular, the server unit 10 supplies, together with the TOC0 information command (TOC0 INFO), the content number ("02h"; which indicates that this is the second download track) as a load order number of the ATRAC data whose title is "Morning", the track mode "86h" of the content #3 and the track size "0020h. 1eh. 00h" of the content #3.

When the track mode and the track size of the second content (#3) whose downloading has been performed is received, the recording and playback section 20 performs processing to produce, based on the information received, information of the U-TOC sector 0 and record it onto the disc D. Accordingly, at time t44, the track mode and the start address and end address corresponding to the content #3 are recorded into the U-TOC sector 0 of the disc D. The second content (#3) whose downloading has been performed is thereafter managed as a fourth track Tr4 of the disc D.

Then, the server unit 10 supplies the stop command (STOP) "03h" in step t45 as seen in FIG. 24A. When the stop command (STOP) is received, the recording and playback section 20 determines that processing corresponding to the TOC0 information command (TOC0 INFO) "04h" supplied formerly is completed, and performs processing of deleting the remaining data deciding that there is no data at any address later than the end address corresponding to the duplicated second content (#3).

Accordingly, at time t46, together with data of the first and second tracks Tr1 and Tr2 recorded already, the tracks of the contents #2 and #3 are managed by the U-TOC sector 0.

FIGS. 25A to 25D and 26A to 26D are time charts illustrating processing of title information and so forth which are supplied from the server unit 10 to the recording and playback section 20 in step S209 described hereinabove.

It is to be noted that FIGS. 25A, 25B, 25C and 26A, 26B, 26C show time charts of communication data and processing between the server unit 10 and the recording and playback section 20, and FIGS. 25D and 26D illustrate recording conditions of the U-TOC sector 1 and sector 4 of the disk at different times.

First, as seen in FIG. 25D, at time t51 before which no title command (Title) is received, only the titles of the first and second tracks Tr1 and Tr2 recorded already are recorded in the U-TOC sector 1 and sector 4 of the disc D.

The server unit 10 supplies, later than time t52, the title of the first content (#2) as a content which has been downloaded.

In particular, the server unit 10 supplies, together with the title command (Title), the content number of the ATRAC data, the number of characters to be supplied and character data of the title "Hello" of the content.

More particularly, as seen from FIG. 25A, first at time t52, the server unit 10 transmits the track number "01h" subsequently to the track number command (TNO) "05h" to inform the recording and playback section 20 that information of the first content (#2) of the contents which have been downloaded is being transmitted.

If it is confirmed from the signal (RTS/CTS(UD)) that processing corresponding to the track number command (TNO) has been performed by the recording and playback section 20, then the server unit 10 transmits, later at time t53, information of the number of characters and character train data together with the title command (Title) "83h".

When the title of the first content (#2) as the downloaded content is received, the recording and playback section 20 performs processing to produce information of the U-TOC sector 1 and the U-TOC sector 4 based on the information received and record the information onto the disc D.

It is to be noted that, whether the number of characters of the title is larger than a prescribed number, the processing is performed divisionally in a plurality of times.

In particular, if data for only four characters can be supplied by one transmission, then the four characters of "Hell" are supplied first at time t53 and then the one character "o" is supplied at time t54.

Accordingly, at time t55, the title corresponding to the content #2 (the third track Tr3 of the disc D) which has been downloaded is recorded into the U-TOC sector 1 of the disc D. It is to be noted that, where title information by "kanji" characters, European characters or the like is supplied by a similar transmission process, the recording and playback section 20 performs recording of the U-TOC sector 4 based on the information.

After the processing of the recording and playback section 20 regarding the title information of the content #2, the server unit 10 supplies the title of the downloaded second content (#3) at time t56 illustrated in FIG. 26A.

In particular, the server unit 10 first transmits the track number "02h" following the track number command (TNO) "05h" as the content number of the ATRAC data to inform the recording and playback section 20 that the information being transmitted is information of the second content (#3) of the contents having been downloaded. Then, if corresponding processing is performed by the recording and playback section 20, then the server unit 10 subsequently transmits information of the number of characters and character train data together with the title command (Title) "83h".

It is to be noted that the character train data in this instance is "Morning" and includes more than four characters, it is divided into "Morn" and "ing" and transmitted divisionally by two times as seen in FIG. 26A.

When the title of the downloaded second content (#3) is supplied in this manner, the recording and playback section 20 performs processing to produce information of the U-TOC sector 1 (depending upon the case, the sectors 1 and 4) and record it onto the disc D.

Accordingly, at time t57, the title corresponding to the second content #3 (fourth track Tr4 of the disc D) which has been downloaded is recorded into the U-TOC sector 1 of the disc D.

Then, when the recording and playback section 20 completes recording processing of all of the titles as seen in FIG. 26C, the server unit 10 supplies the stop command (STOP) "03h", thereby ending the processing thereof.

It is to be noted that, where there remains information to be recorded onto the U-TOC sector 5, 6 or the like, transmission processing of the information is performed in a similar manner before the stop command (STOP) "03h" is supplied. Then, at the point of time when all TOC information is downloaded, the stop command (STOP) "03h" is supplied.

By performing such processing as described above, the audio server system 1 can record U-TOC information regarding downloaded audio data onto the disc D. In particular, onto the disc D, in addition to the first track Tr1 with the title of "Emotion" and the second track Tr2 with the title of "Dream" which are recorded already, TOC information and ATRAC data of a third track Tr3 with the title of "Hello" and a fourth track Tr4 with the title of "Morning" which have been downloaded from the server 12 can be recorded.

Naturally, if character data and/or image data are further downloaded, then they are recorded onto a predetermined U-TOC sector or sectors.

As described above, in the audio server system 1, the server unit 10 transmits the track size of each track together with ATRAC data, and the recording and playback section 20 decomposes the data stream recorded on the disc D based on the track sizes and records the start addresses and the end addresses of the individual tracks into the U-TOC of the disc D.

Consequently, with the audio server system 1, a track or tracks selected by a user can be downloaded accurately onto the disc D. Further, since the recording and playback section 20 records ATRAC data as a single track based on a data stream transmitted thereto and records start addresses and end addresses of individual tracks in such a form that the data stream of the single track is divided, the utilization efficiency of the disc D can be raised.

By the way, upon such downloading, various operations can be performed using the playback section 41 and/or the relating information playback section 46.

In particular, in the audio server system 1, while the recording and playback section 20 records ATRAC data, the compressed ATRAC data being recorded by the recording and playback section 20 are decompressed and played back by the playback section 41. Consequently, when one or more tracks are to be recorded onto the disc D, the user can confirm audio data of a corresponding track being recorded.

However, since the data being downloaded are compressed data of the ATRAC system, a portion of the data which can be played back as a music program is part of a program. For example, in the case of data compression to approximately $1/5$, monitor playback for $1/5$ the entire program can be performed.

The location to be played back for monitoring may possibly be selected from several portions such as, for example, a top portion of the program, a highlight portion, and a portion which has been set upon uploading by an upload user.

Further, in the audio server system 1, together with monitor playing back of ATRAC data to be recorded onto the disc D by the playback section 41 or in place of playing back of ATRAC data by the playback section 41, a still picture or moving pictures, text data or the like can be played back as relating information of ATRAC data to be recorded onto the disc D by the relating information playback section 46.

In particular, the main controller 11 of the server unit 10 acquires a file of character data and/or image data stored in the server 12 together with ATRAC data as one content from the server 12 and supplies the file to the printer apparatus 47 or the display apparatus 48 of the relating information playback section 46. When image data are supplied, then the printer apparatus 47 of the relating information playback section 46 prints the image data on paper, for example, in response to an operation of the user to present it to the user. Further, when image data are supplied, the display apparatus 48 of the relating information playback section 46 displays the image data, for example, in response to an operation of the user.

Further, where a URL (Uniform Resource Locator) which is an address of a WWW server is involved, the main controller 11 of the server unit 10 acquires the relating information from a home page or the like through the communication interface 44 and supplies it to the printer apparatus 47, display apparatus 48 and speaker 49 of the relating information playback section 46. When information of the WWW server is received, the printer apparatus 47, the display apparatus 48 and so forth of the relating information playback section 46 output moving pictures, a still picture, sound, character information and so forth in response to an operation of the user.

As described above, with the audio server system 1, while ATRAC data are being downloaded onto a disc D, images, sound and text data stored in advance in the server 12 or relating information acquired from a network such as the internet through a transmission medium is displayed on the display apparatus 48 or printed by the printer apparatus 47 and can thus be provided to a download user.

8. Example of Uploading Operation

An example of uploading operation executed by the uploading processing described hereinabove with reference to FIGS. 18 and 20 is described below with reference to FIGS. 28A and 28B, 29A to 29E, 30A to 30D, 31A to 31D, 32A to 32D and 33.

Here, particularly an example wherein tracks for two programs are uploaded into the server 12 is described with reference to the timing charts and so forth.

It is assumed that a large number of contents like contents #1, #2, #3, . . . are recorded in the server 12 as seen in FIG. 28A.

Further, it is assumed that, as seen in FIG. 28B, three musical programs of a first track Tr1 whose title is "Woman", track mode (trmd) is "e6" and track size is 0010.05.03", a second track Tr2 whose title is "Street", track mode (trmd) is "e6" and track size "0012.10.3e" and a third track Tr3 whose title is "Night", track mode (trmd) is "86" and track size is "0021.1e.06" are recorded on a disc D carried in by a user who wants to effect uploading.

Here, it is assumed that the user loads the disc D into the recording and playback section 20, designates the tracks Tr2 and Tr3 of the disc D and performs an operation for uploading.

As the uploading operation, such processing as illustrated in FIGS. 29A to 29E, 30A to 30D, 31A to 31D, and 32A to 32D is performed.

FIGS. 29A to 29E are time charts of communication of command data between the server unit 10 and the recording and playback section 20 when ATRAC data are uploaded. It is to be noted that the RTS/CTS signal is omitted in FIGS. 29A to 29E.

First, the server unit 10 transmits the upload track number command (UPLOAD TNO) to the recording and playback section 20 at time t61 illustrated in FIG. 29C. In particular, the server unit 10 informs the recording and playback section 20 with the upload track number command (UPLOAD TNO) "11h" and a number of tracks "02h" and track numbers "02h" and "03h" following the same that the tracks Tr2 and Tr3 have been selected as an object of uploading. This processing corresponds to the processing in step S301 described hereinabove.

Then at time t62, the server unit 10 transmits the upload playback command (UPLOAD PLAY) "12h" to the recording and playback section 20 as seen in FIG. 29C. This corresponds to the processing in step S302.

In response to the transmission, the recording and playback section 20 starts a playback operation of the tracks Tr2 and Tr3 designated by the upload track number command (UPLOAD TNO). Then, as seen from FIG. 29D, the recording and playback section 20 transmits the value "01h" representative of upload playback to the server unit 10 together with the status command (UD STATUS) "20h".

The server unit 10 transmits the request signal (Data Req(s)) to the recording and playback section 20 later than time t63. In response to the request signal (Data Req(S)), the recording and playback section 20 starts supply of ATRAC data for the predetermined amount, that is, ATRAC data (ATRAC(UD)) of the tracks Tr2 and Tr3 played back from the disc D.

Then, the server unit 10 transmits, in response to the recording operation into the server 12, the request signal (Data Req(UD)) to the recording and playback section 20 as seen in FIG. 29B. In response to the request signal (Data Req(UD)), the recording and playback section 20 successively supplies ATRAC data to the server unit 10 as seen in FIG. 29A.

Meanwhile, the server unit 10 supervises to detect whether or not the status command (UD STATUS) is transmitted from the recording and playback section 20 to determine whether or not the recording condition of the recording and playback section 20 is normal. This corresponds to the processing in step S303 described hereinabove.

If the recording and playback section 20 determines that all ATRAC data are supplied to the server unit 10, then it stops its playback operation at time t64 as seen from FIG. 29D and informs the server unit 10 that a stopping condition is entered with the status command (UD STATUS) "20h" and the value "00h" representing the stopping condition.

Consequently, the server unit 10 detects completion of the uploading of ATRAC data and ends recording of ATRAC data into the server 12.

FIGS. 30A to 30D are time charts of communication of a TOC information request from the server unit 10 to the recording and playback section 20 which is performed in step S306 described above.

After the recording of ATRAC data into the server 12 is completed, the server unit 10 transmits, at time t71, the TOC request command (TOC REQ) to the recording and playback section 20 as seen in FIG. 30A to make a request for transmission of TOC information.

In particular, the server unit 10 first transmits an argument "00h" together with the TOC request command (TOC REQ) "14h" to request for information of the U-TOC sector 0 regarding the uploaded tracks.

In response to the request, the recording and playback section 20 supplies, at time t72, the TOC0 information command (TOC0 INFO) and arguments thereof, that is, the track mode and the track size of the first track (in this instance, the track Tr2) from between the two tracks which have been uploaded.

In particular, the recording and playback section 20 supplies, as seen in FIG. 30B, together with the TOC0 information command (TOC0 INFO), the track number "01h" (which indicates that the track is the first upload track from between the two upload tracks) as a loading order number of ATRAC data of the track Tr2, and such track mode "e6h" of the track Tr2 and track size "0012h. 10h. 3eh" of the track Tr2 as seen in FIG. 28B.

When the track mode and the track size of the first track (Tr2) which has been uploaded is received, the server unit 10 produces file management information based on the information supplied thereto and re-arranges the ATRAC data in the server. It is to be noted that, during execution of the processing, the server unit 10 returns the signal (RTS/CTS (S)).

Then, later than time t73, the recording and playback section 20 supplies the track mode and the track size of the track Tr3 which is the second upload track. In particular, the recording and playback section 20 supplies, together with the TOC0 information command (TOC0 INFO) "04h", the track number "02h" (which represents that the track is the second upload track) as a loading order number of the ATRAC data of the track Tr3, the track mode "86h" of the track Tr3, and the track size "0021h. 1eh. 06h" of the track Tr3.

When the track mode and the track size of the second track (Tr3) which has been uploaded are received, the server unit 10 produces file management information based on the information supplied thereto and re-arranges the ATRAC data in the server.

After the transmission of the information of the U-TOC sector 0 regarding all of the upload tracks, the recording and playback section 20 transmits completion of the transmission using the stop command (STOP) "03h" at time t74 as seen in FIG. 30B.

When the stop command (STOP) is received, the server unit 10 determines at time t75 that processing corresponding to the TOC0 information command (TOC0 INFO) "04h" supplied formerly is completed, and performs processing of deleting the remaining data deciding that there is no data at any address following the end address corresponding to the uploaded second track (Tr3).

The server unit 10 fetches the information of the U-TOC sector 0 transmitted in this manner and makes the information correspond to the uploaded tracks. In particular, since the ATRAC data of the two tracks are uploaded as a single data stream, the data stream is decomposed with the data size for each track based on the fetched information of the U-TOC sector 0 to establish a condition wherein the uploaded tracks are individually managed correctly as the contents. FIGS. 31A to 31D and 32A to 32D show time charts of a TOC information request communicated from the server unit 10 to the recording and playback section 20 in step S306 described hereinabove.

The TOC information request is a request for title information (information of the U-TOC sector 1 and the U-TOC sector 4 of the disc D).

The server unit 10 transmits, at time t81, the TOC request command (TOC REQ) to the recording and playback section 20 to make a request for transmission of the TOC information.

In particular, the server unit 10 transmits, together with the TOC request command (TOC REQ) "14h", an argument "01h" to request for information of the U-TOC sector 1 regarding the uploaded tracks.

In response to the request, the recording and playback section 20 supplies, at time t82, the title of the first track (Tr2) as a track which has been uploaded.

In particular, the recording and playback section 20 supplies, together with the title command (Title), the track number of the ATRAC data, the number of characters to be supplied and the charged data of the title "Street" of the track.

More particularly, the recording and playback section 20 first transmits, at time t82, the track number "01h" next to the track number command (TNO) "05h" to inform the server unit 10 that information of the track being transmitted is information of the first track (Tr2) of the two tracks which have been uploaded.

If it is confirmed from the signal (RTS/CTS(S)) that processing corresponding to the track number command (TNO) has been performed by the server unit 10, then the recording and playback section 20 transmits, later at time t83, information of the character number and character train data together with the title command (Title) "183h".

When the title of the first track (Tr2) as an uploaded track is received, the recording and playback section 20 performs processing of registering the information supplied thereto in a corresponding relationship to the ATRAC data of the track Tr2.

It is to be noted that, in this instance, since the number of characters of the title is larger than the prescribed number, the server unit 10 supplies the four characters "Stre" first at time t83 and then supplies the remaining two characters "et" at time t84.

Accordingly, at time t85, the title corresponding to the uploaded track Tr2 is recorded into the server 12. It is to be noted that, where title information by "kanji" characters or European characters is received in a similar transmission process, the server unit 10 performs registration based on the information.

After the processing of the server unit 10 regarding the title information for the track Tr2 is completed, the server unit 10 supplies the title of the uploaded second track (Tr3) at time t86 illustrated in FIG. 32B.

In particular, the recording and playback section 20 first transmits the track number "02h" next to the track number command (TNO) "05h" as the track number of the ATRAC data to inform the server unit 10 that the information being transmitted is the information of the second track Tr3 from between the uploaded two tracks. Then, if corresponding processing is performed by the server unit 10, then the recording and playback section 20 transmits information of the character number and the character train data together with the title command (Title) "83h".

It is to be noted that, in this instance, since the character train data is "Night" and the number of characters is larger than 4, it is divided into "Nigh" and "t" and transmitted divisionally by two times.

When the title of the uploaded second track (Tr3) is supplied in this manner, the server unit 10 performs processing of registering the information supplied thereto in a corresponding relationship to the ATRAC data of the track Tr3 into the server 12.

Then, when the server unit 10 completes registration processing of all titles, the recording and playback section 20 supplies the stop command (STOP) "03h" to the server unit 10 at time t88.

After fetching of all information of the U-TOC sectors is completed, the server unit 10 transmits the upload end command (UPLOAD FIN) "13h" to the recording and playback section 20 to inform the recording and playback section 20 of the completion of uploading as seen in FIG. 32A.

It is to be noted that, where character data and/or image data are recorded in the U-TOC sector 5 and/or sector 6 in addition to the information of the U-TOC sector 0, sector 1 and sector 4, a transmission request for such information is made in a similar manner before the upload end command (UPLOAD FIN) "13h" is supplied. Then, at a point of time when all of the TOC information is uploaded, the server unit 10 transmits the upload end command (UPLOAD FIN) "13h" to the recording and playback section 20.

By performing such processing, the audio server system 1 can upload audio data and relating information recorded in the U-TOC precisely to the server 12 from the disc D.

In the example described, in addition to the contents recorded already, the content #m with the title of "Street" and the content #m+1 with the title of "Night" which have been uploaded are registered in the server 12 together with the relating information of the same as seen in FIG. 33.

By the way, also upon this uploading, various operations can be performed using the playback section 41 and the relating information playback section 46.

In particular, in the audio server system 1, while the server unit 10 is recording ATRAC data, the compressed ATRAC data are supplied also to the playback section 41 so as to be decompressed and played back. Consequently, the upload user can confirm whether or not a musical program or the like desired by the upload user itself has been uploaded correctly.

Further, in the present audio server system 1, it is also possible to output character information and/or image information to be uploaded together with ATRAC data by means of the relating information playback section 46 so as to allow the upload user to effect confirmation from a display output or a print output.

9. Audio Server System Employing Network

While the audio server system having such a construction as described above with reference to FIG. 3 is described above, the audio server system of the present invention can be implemented also where, for example, a communication network is used.

FIG. 34 illustrates an image of the modified audio server system just mentioned. Referring to FIG. 34, a center server 100 is connected to CD shops 101, 102 and 103, and common homes 104, 105 and 106, each of which has a server terminal, by a communication network.

Each server terminal has, for example, such functions as those of the recording and playback section 20 described hereinabove. Meanwhile, the center server 100 has, for example, such functions as those of the server unit 10 described hereinabove.

Consequently, it is possible to perform uploading into the center server 100 over the communication network using a server terminal in a home or a shop such as a CD shop. Also it is possible to perform downloading from the center server 100 over the communication network in a home or a shop such as a CD shop.

By implementing such a system as described above, a wide-range and very easy providing form for music or the like can be realized.

While it is described in the description of the embodiment that audio data are recorded onto a magneto-optical disc, the present invention can be applied not only to a system which records audio data but also to another apparatus which records, for example, video data.

Further, the applicable recording medium is not limited to a magneto-optical disc such as a mini disc, but also any other recording medium can be applied only if it allows random accessing.

Naturally, for processing methods for uploading, downloading and so forth, various methods can be applied.

As can be recognized from the foregoing description, the data transmitting and receiving system of the present invention can achieve the following effects.

The data transmitting and receiving system of the present invention has an effect that a user can lay open data owned by the user itself such as, for example, an original musical program and sell it to many and unspecified users readily using the data transmitting and receiving system and a recording medium owned by the user.

The data transmitting and receiving system of the present invention has another effect that many and unspecified users can obtain even personal information, which has conventionally been difficult to obtain, such as, for example, a musical program of an amateur musician readily.

Since a same recording medium such as, for example, a mini disc is used commonly for both of uploading and downloading, the convenience in use of the system is augmented. For example, the data transmitting and receiving system of the present invention is convenient also where a certain user first performs uploading and then performs downloading in succession. Further, where a same recording medium is used, confusion in use by users can be avoided.

Further, since a recording and playback apparatus section which serves both of recording means and playback means can be utilized as a system construction, also simplification in construction can be realized.

A user who performs uploading can provide character data and/or image data together with compressed audio data. For example, as characters incidental to a musical program, the words, a message, a live schedule or an explanation can be provided, and as an image, a photograph of a user, an image picture or the like can be provided. Consequently, there is an effect that transmission of information having a high added-value becomes possible.

A user who performs uploading can store necessary information into a server using information inputting means. The information may be information such as, for example, a message, which can be provided to many and unspecified persons, or may be information which defines a condition for downloading regarding a musical program or the like provided by uploading. In particular, upon uploading, information to be added to information stored on a portable recording medium or information which a person who executes uploading wants to indicate to the system can be inputted arbitrarily. This can allow various information providing forms.

Also a password or the like to be used to accept a download charge or for various management can be set arbitrarily by a user.

A person who executes uploading can set a charge for downloading (an amount of money which the upload user wants to receive for one downloading operation) for compressed audio data of an object of uploading from the information inputting means. In other words, also when information is to be provided with charge, the information providing person can set the charge in accordance with its personal situation.

Upon uploading, the audio server system can generate various necessary information and use it for management of uploaded compressed audio data and so forth. For example, where the audio server system generates the date of uploading or the data size and stores it in a corresponding relationship to the uploaded data, it can be used for a display in a table upon downloading or for management of other stored data. Consequently, the usefulness and the efficiency of the system operation can be augmented.

Further, for example, a password of a person who performs uploading can be set automatically and can be used for specification of the user upon payment of a download charge or upon instruction of erasure.

A user who performs downloading can obtain also character data and/or image data in addition to audio data selected by the user, and information of a high added-value can be obtained.

Upon downloading, payment of a charge can be demanded appropriately to a person who performs the downloading, and the data transmitting and receiving system can function appropriately as an information providing system with charge.

Since results of downloading are managed in a corresponding relationship to stored compressed audio data, the information can be utilized effectively. For example, the information can be used as a basis for imposition of a charge upon a person who performs uploading, or can be used as a barometer of the degree of popularity. Further, to a person who performs downloading, it is possible to present, for example, a musical program which is very popular or to produce a hit chart in the audio server system.

Where the audio server system is implemented over a communication network, uploading and downloading of compressed audio data and other information can be performed widely by a public communication network even at a place other than, for example, a shop or the like where server means, playback means or recording means is installed. In other words, there is an effect that an audio server system which is higher in efficiency and can be utilized by wide-range users can be provided.

What is claimed is:

1. A data transmitting and receiving system connected to an information center for transmitting content data and user identification code to the information center and for receiving the content data and payment information from said information center, the system comprising:

loading means into which is loaded a recording medium on which is recorded units of content data produced by a producer, said units of content data being compressed in time while being recorded;

inputting means for inputting the user identification code by the producer;

playback means for playing back the units of compressed content data produced by the producer and stored on the recording medium;

transmitting means for transmitting the user identification code for identifying the producer of the content data, data size information representing a stream length of data corresponding to each unit of the compressed content data, and pricing information unique to the compressed content data over a command line and for transmitting units of compressed content data played back by said playback means;

selection means for selecting desired content data from a large capacity storage in said information center;

reception means for receiving desired content data selected by said selection means when a user selects the desired content data and for receiving over said command line the payment information from said information center when the producer is identified in accordance with the user identification code; and recording means for recording the compressed data received by said reception means onto the recording medium which is loaded in said loading means by the user and for recording the payment information received by said reception means onto the recording medium that is loaded in said loading means by the producer.

2. A machine comprising:

insert means for inserting a recording medium into a main body of the machine;

upload means for uploading units of compressed content data and user identification code for identifying a producer that produced the content data to a memory means from the recording medium inserted into the insert means by the producer and including input means for inputting the user identification code by the producer;

download means for downloading the user identification code for identifying the content data producer, data size information representing a stream length of the compressed content data corresponding to each unit of the compressed content data, and pricing information unique to the compressed content data over a command line, and for downloading the compressed content data selected by a user, wherein the data, code, and information are all downloaded from the memory means to another recording medium;

generating means for generating management information indicating sales information of the selected content and sending the management information to the producer of the selected content;

payment means for providing a payment corresponding to the selected units of compressed content data that was downloaded by the user, and comparison means for comparing the identification data read from the memory means with a password input by the producer, whereby when the identification data agrees with the password, then the producer accepts the payment from the payment means.

* * * * *